United States Patent [19]

Hanson et al.

[11] Patent Number: 4,685,387

[45] Date of Patent: Aug. 11, 1987

[54] MACHINE FOR MAKING SANDWICHES

[75] Inventors: Robert K. Hanson, Framingham; Herbert H. Loeffler, Arlington; Philip J. Mattera, Beverly, all of Mass.

[73] Assignee: Hanson Technology Corp., Northborough, Mass.

[21] Appl. No.: 767,517

[22] Filed: Aug. 20, 1985

[51] Int. Cl.⁴ .......................... A21C 9/04; B23B 31/04
[52] U.S. Cl. .................................... 99/450.4; 99/450.1
[58] Field of Search ................. 99/450.1, 450.4, 450.7, 99/450.8, 494, 450.5; 221/258, 303; 222/368

[56]  References Cited

U.S. PATENT DOCUMENTS 1,108,454  8/1914  Maisch ................................ 99/450.4
2,016,233  10/1935 Herman ............................... 99/450.4
4,202,260  5/1980  Weger .................................. 99/450.4

*Primary Examiner*—Timothy F. Simone
*Attorney, Agent, or Firm*—Schiller, Pandiscio & Kusmer

[57]  ABSTRACT

A machine for automatically producing a sandwich having a variety of fillers such as sliced meat, sliced cheese, shredded lettuce, and sliced pickles. A plurality of cannisters for storing the fillers are positioned above apertures formed in the base of the machine along a straight row. Dispensing means associated with each cannister permit selective removal of sandwich filler. A carriage having support means for carrying the sandwich facing, such as a submarine roll or Pullman bread, is mounted for reciprocation beneath the row(s) of apertures. As the carriage passes beneath selected apertures, sandwich filler is dispensed through the apertures onto the sandwich facing. Control means permit user selection of sandwich fillers and controls operation of the dispensing means and movement of the carriage beneath the apertures in accordance with user selection.

28 Claims, 16 Drawing Figures

MACHINE FOR MAKING SANDWICHES

BACKGROUND OF THE INVENTION

1. Field of the Invention

The present invention relates to a highly automated device for making sandwiches and other sandwiched food items. This device has application in the food service and vending machine industries.

2. Description of the Prior Art

Machines used in the assembly of sandwiches and sandwiched food items are known. Several of these machines are described in the following U.S. patents: Maisch, U.S. Pat. No. 1,108,454; Hungerford, U.S. Pat. No. 1,575,207; Estrin, U.S. Pat. No. 1,777,830; and, Herman, U.S. Pat. No. 2,016,233. The prior art machines automate only one or two of the various operations involved in sandwich assembly. Practically speaking, sandwiches must be assembled by hand when using these machines. Additionally, the prior art machines permit the assembly of one or at most a limited number of different sandwich types without reloading or modifying the apparatus.

These limitations in the speed and flexibility of the prior art machines have prevented their widespread use. As a result, the food service industry and other organizations producing large quantities of sandwiches must assemble sandwiches by hand at great time and expense. Typically, a sandwich takes 60 to 120 seconds to assemble by hand. Clearly, a significant need exists for a highly automated sandwich making machine.

SUMMARY OF THE INVENTION

The primary object of this machine is to provide a new and improved automated sandwich machine which will rapidly produce a variety of different sandwiches with minimal human intervention.

A more specific primary objective of this invention is to provide an automated sandwich-making machine having improved means for: (a) storing one or more sandwich fillers, (b) selectively dispensing the sandwich filler, (c) moving the sandwich facing into alignment with a selected sandwich filler for dispensing of the filler onto the facing, and (d) successively producing a variety of different sandwiches without modifying or reloading the machine for each different sandwich to be produced.

These and other objects are achieved by providing a machine having a horizontal base, one or more rows of apertures in said base, cannisters positioned above each of the apertures, a carriage mounted beneath the horizontal base for movement along a predetermined path beneath the row(s) of apertures, dispensing means positioned adjacent the bottom of the cannisters, and control means for controlling the operation of the machine, so that as sandwich facings carried on the carriage are moved beneath the apertures selected sandwich fillings stored in the cannisters are dispensed through the apertures onto the sandwich facing.

In a first embodiment, the invention includes a plurality of first cannisters each adapted to store a solid sandwich filler such as meat or cheese, first dispensing means comprising a door slidably mounted on a bottom end of each cannister, door operating means for moving each door between a first open position and a second closed position, a sandwich facing support tray mounted on the carriage, knife means mounted on the carriage, openings in the carriage beneath and in alignment with the knife means, so that as the knife means which removes individual slices of solid filler from one of the cannisters, the slices will fall through the openings onto the sandwich facing positioned on the support tray.

In a second embodiment the invention includes a plurality of second cannisters each adapted to store loose sandwich filler, such as tuna fish salad, sliced pickles or shredded lettuce, second dispensing means comprising a feed wheel mounted at the bottom end of each second cannister, recesses formed in the peripheral surface of each feed wheel for dispensing a measured quantity of loose filler, a selectively actuated feed wheel drive means mounted adjacent each feed wheel, a sandwich facing support tray mounted on the carriage, an optional wiper means operatively coupled to each feed wheel drive means, and means for selectively activating said feed wheel drive means, so that as the carriage approaches a selected second cannister its feed wheel drive means is actuated to cause the associated feed wheel to rotate and dispense loose sandwich filler onto the sandwich facing positioned on the support tray. The optional wipers are arranged to remove residual loose sandwich filler from the recesses in the feed wheels after filler has been dispensed from those recesses onto a sandwich facing.

In the preferred embodiment, the invention includes the first cannisters and first dispensing means of the first embodiment in association with a first row of apertures in said base and the second cannisters and second dispensing means of the second embodiment in association with a second parallel row of apertures in said base, a sandwich facing support tray mounted on the carriage for supporting the sandwich facing, selectively operable positioning means for moving the support tray from a first position beneath the first row of apertures to a second position beneath the second row of apertures, so that when the support tray is disposed in its first position solid sandwich filler may be dispensed from selected ones of said first cannisters onto a sandwich facing, and when the support tray is disposed in its second position, loose sandwich filler may be dispensed from selected ones of said second cannisters onto a sandwich facing. The preferred embodiment also may include an enclosure having one or more doors for permitting access to the machine, and a refrigeration device mounted on or adjacent to the machine for maintaining a selected temperature within the enclosure so as to prevent spoilage of the sandwich filler.

Other objects, features and advantages of the invention are described or rendered obvious in the following detailed specification which is to be considered together with the accompanying drawings wherein like numerals indicate like parts.

THE DRAWINGS

DETAILED DESCRIPTION OF THE INVENTION

Figure 1:
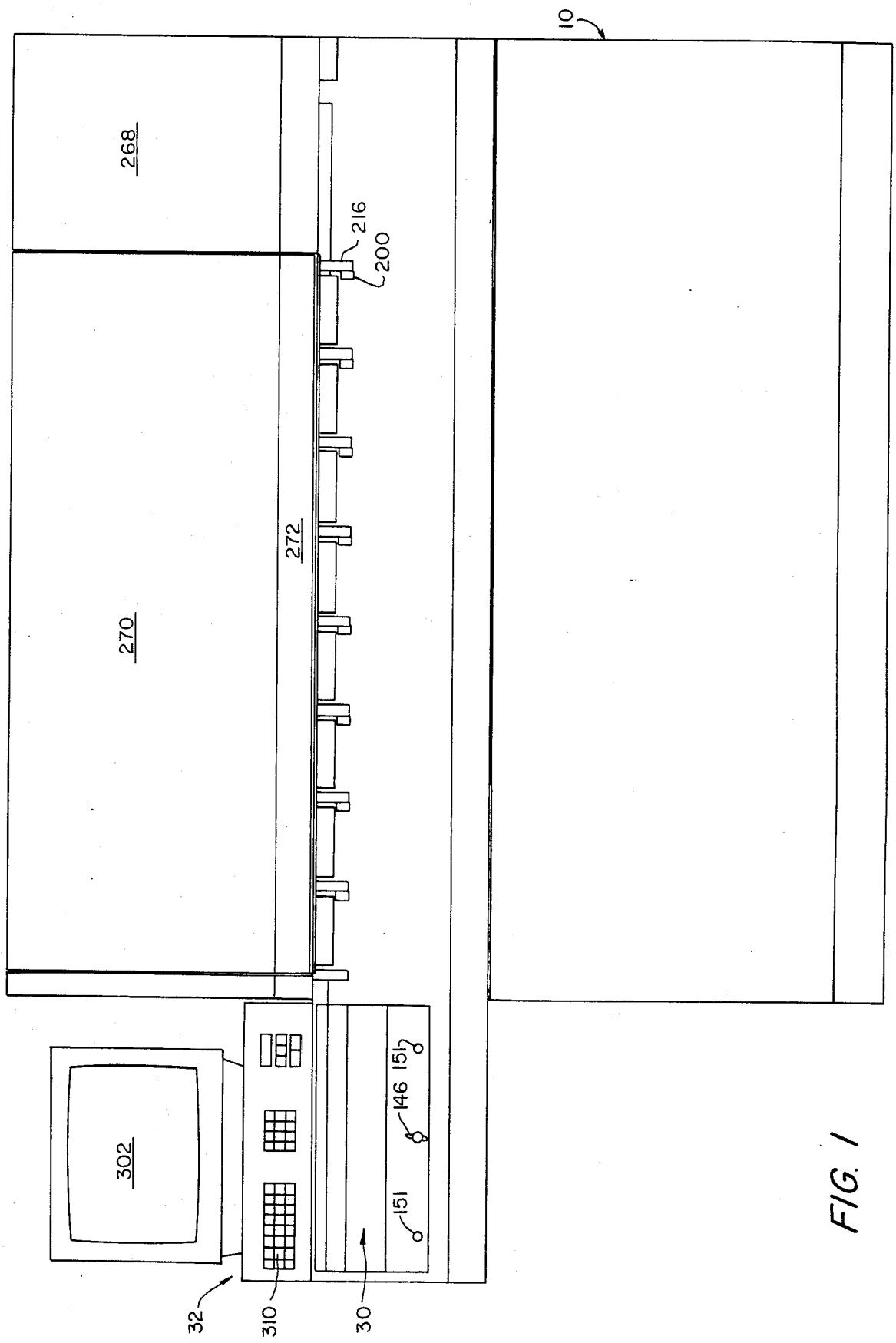
FIG. 1 is a front view of a machine constituting a preferred embodiment of the invention, the machine comprising an enclosure for the sandwich filler cannisters.

Turning to FIGS. 1-6, and 10-13, the preferred embodiment of the invention is a machine 10 for making sandwiches which comprises a horizontal base 14 having a plurality of first apertures 16 arranged in a first row and a plurality of second apertures 18 arranged in a second parallel row. A plurality of first and second cannisters 24 and 26 for storing solid and loose sandwich fillers respectively are positioned above and in alignment with apertures 16 and apertures 18 respectively. A carriage 30 (FIGS. 8-10) is mounted beneath horizontal base 14 for movement along a predetermined path extending parallel to and lengthwise of said first and second rows. As carriage 30 travels along the predetermined path, sandwich filler is dispensed (by means hereinafter described) from cannisters 24 and 26 onto a sandwich facing supported on a tray 140 hereinafter described. A control means 32 (FIG. 15) controls operation of the various components of the invention.

Referring now to FIGS. 3-7, means are provided for dispensing solid sandwich filler from cannisters 24. Such means include the aforementioned first cannisters 24 which are supported by base 14. Cannisters 24 are designed to store selected solid sandwich fillers (not shown) in the form of a loaf of meat or cheese which are preformed to a size corresponding to the internal dimensions of cannisters 24. Although not essential to the invention, it is preferred that stainless steel or other corrosion resistant material be used for the fabrication of cannisters 24 and 26, horizontal base 14, and other selected parts of the machine. Each first cannister 24 is provided with a ballast member 34 (FIG. 5) which has sufficient weight to urge the solid sandwich filler to move down to the bottom of the cannister.

Figure 5:
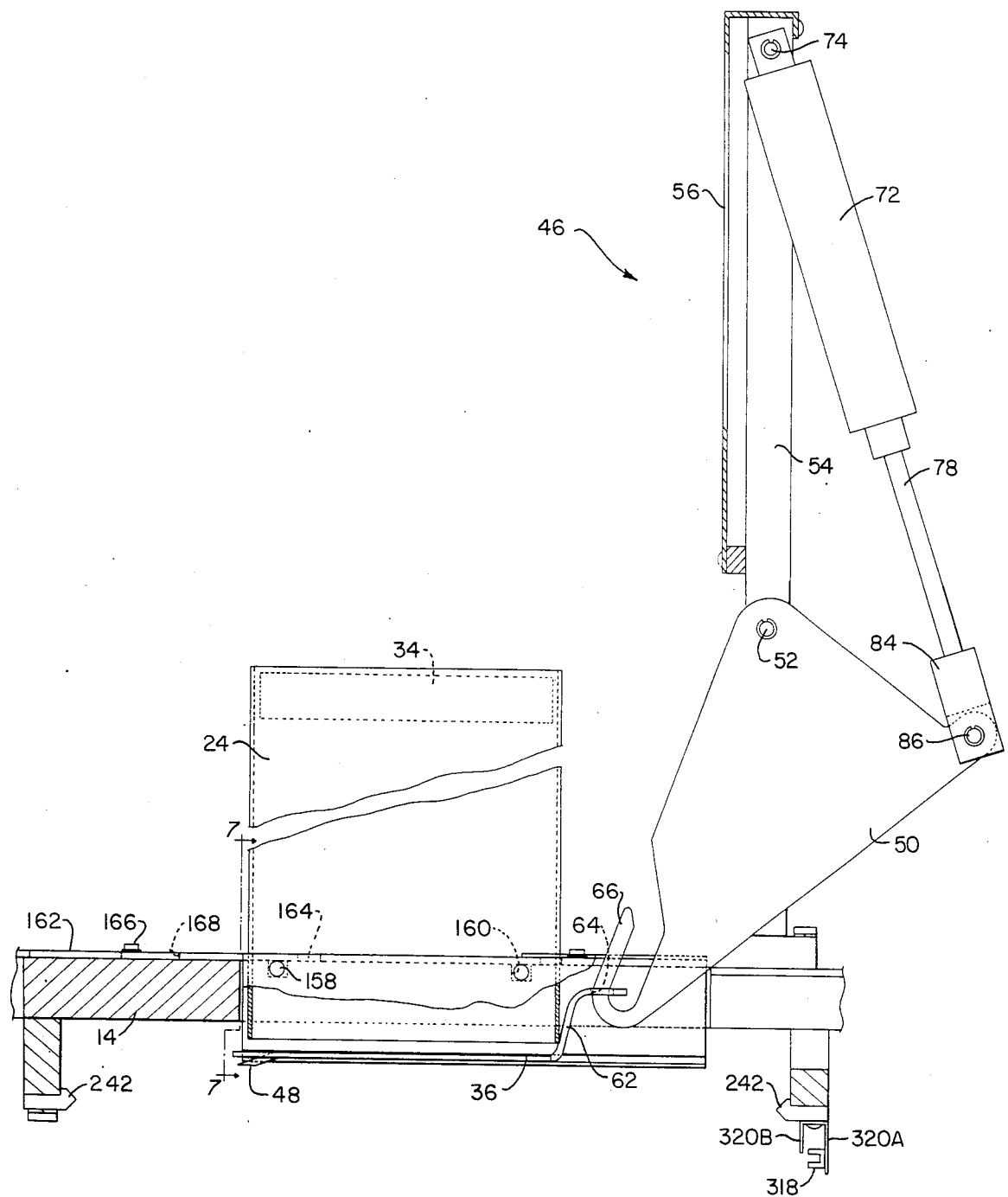
FIG. 5 is a cross-sectional view taken along line 5—5 in FIG. 3 illustrating details of a first cannister and the associated sandwich filler dispensing means.
Figure 6:
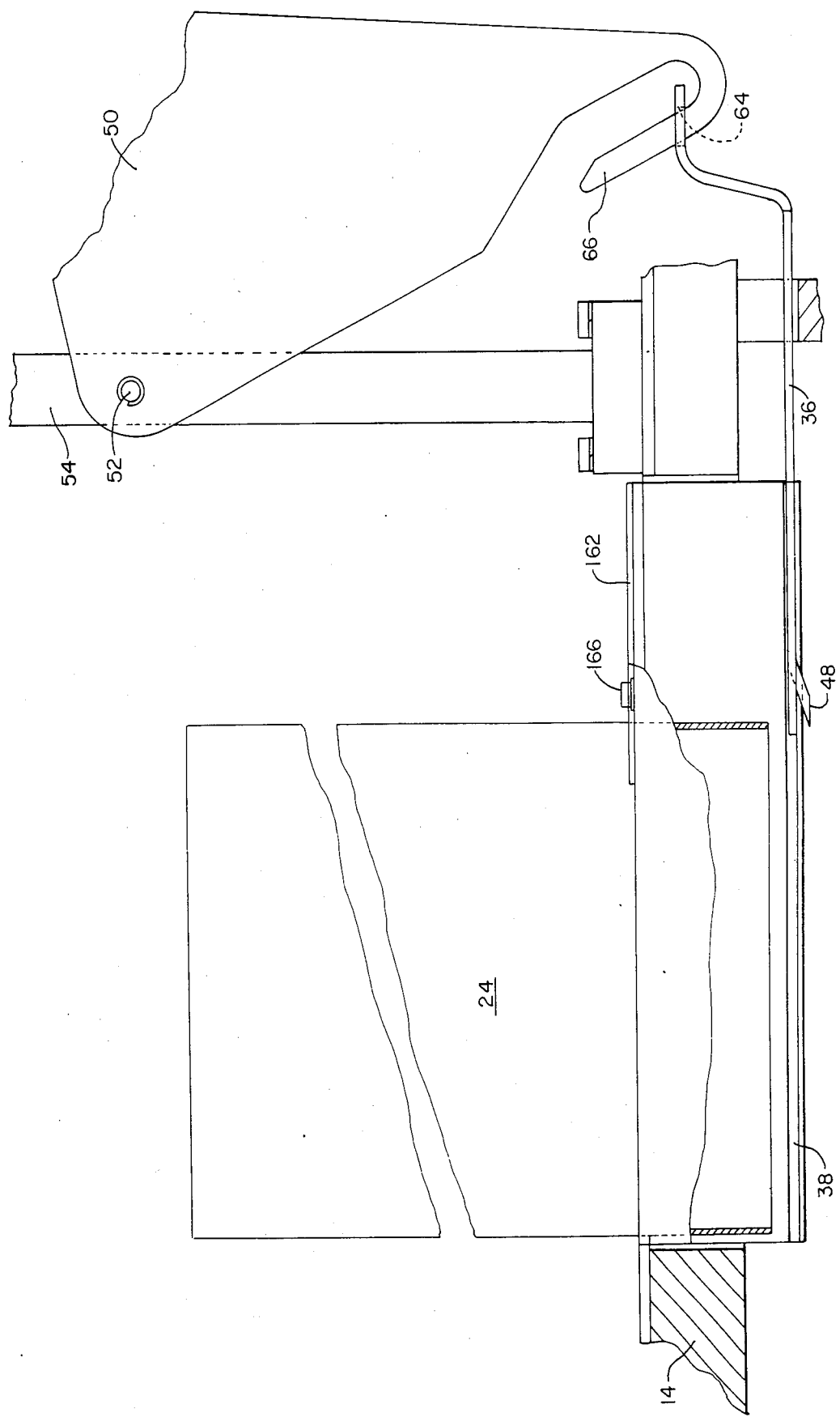
FIG. 6 is an enlargement of a portion of FIG. 5 showing the door in its open position.
Figure 7:
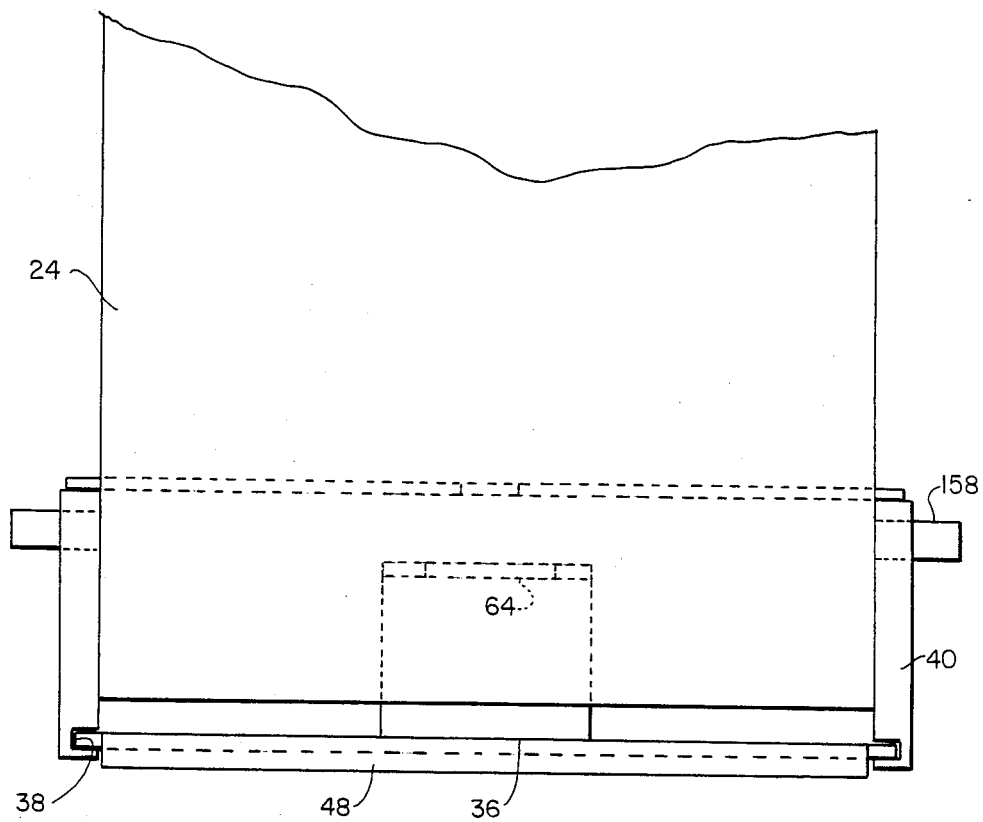
FIG. 7 is a sectional view taken along line 7—7 in FIG. 5.

As best seen in FIGS. 5-7, each solid sandwich filler (not shown) is retained in a cannister 24 by a door 36 which is mounted for sliding movement on tracks 38 formed in a thickened section 40 of the wall of the first cannister 24. When it is desired to expose a selected sandwich filler in one of the cannisters 24, a selected door operating means 46 mounted on the frame 12 adjacent the first row of apertures 16 slides its associated door 36 from a second closed position (shown in FIG. 5) to a first open position (shown in FIG. 6). An inclined leading edge 48 formed on each door 36 between its side edges causes an upward movement to be imparted to the remaining sandwich filler by the closing of door 36.

Figure 3:
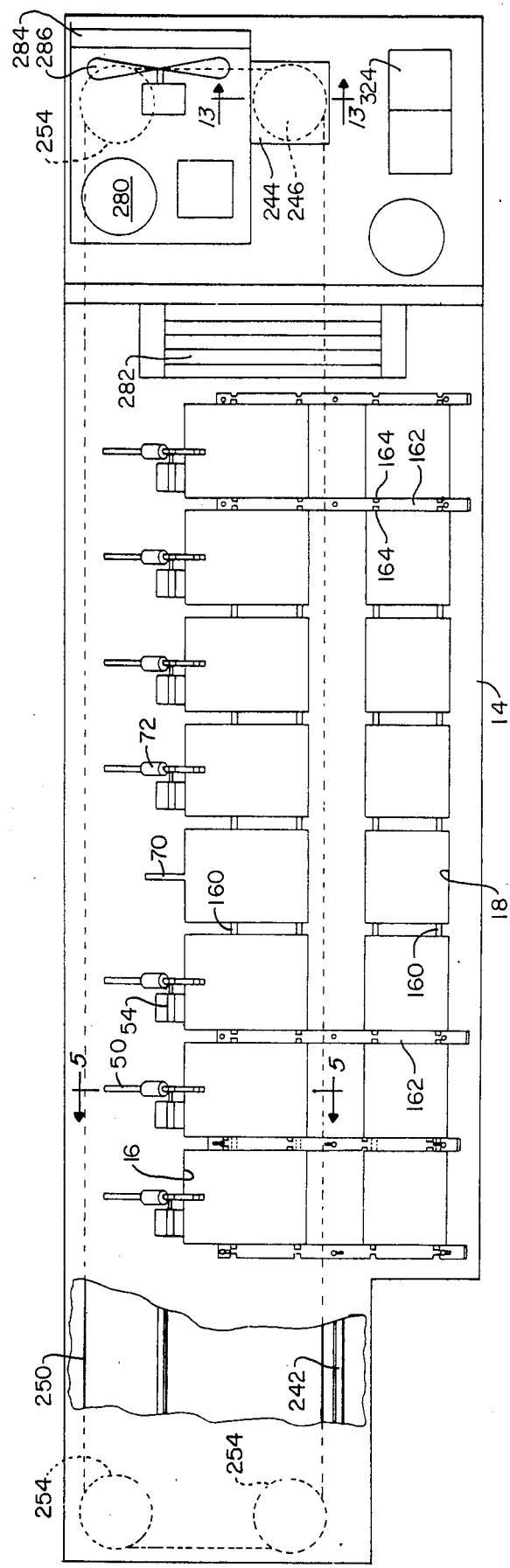
FIG. 3 is a plan view with portions of the enclosure and all of the cannisters removed.

Each door operating means 46 includes a lever 50 rotatably mounted by a stud 52 to vertical frame member 54 (FIGS. 3, 5 and 6) that is secured to horizontal base 14. A transverse frame member 56 extends between and is secured to each vertical frame member 54 to form a rigid structure supported by base 14 (for reasons of clarity, the transverse frame member 56 is omitted from FIG. 3). Each door 36 includes a handle section 62 having a central aperture 64 (FIGS. 5 and 6) sized to receive a hook 66 mounted on an end of lever 50. Base 14 has a plurality of slots 70 (only one of which is shown in FIG. 3) to allow unrestricted movement of that portion of each lever 50 that extends below the top surface of the base 14. Slot 70 may be enlarged at its end adjacent the aperture 16 so that when the door 36 is in the open position a portion of the handle section 62 may extend into the enlargement. A conventional double-acting, two-way pneumatic actuator 72 is fastened at 74 for pivotal rotation relative to the associated frame member 54. The piston rod 78 of actuator 72 has a shackle 84 at its end. The shackle 84 is pivotally attached to lever 50 by a stud 86. When actuator 72 is operated so as to cause its piston rod 78 to be extended, as shown in FIG. 5, lever 50 will be positioned so as to position door 36 in closed position. When actuator 72 is operated so as to retract its piston rod, door 36 will be in open position (FIG. 6).

Figure 8:
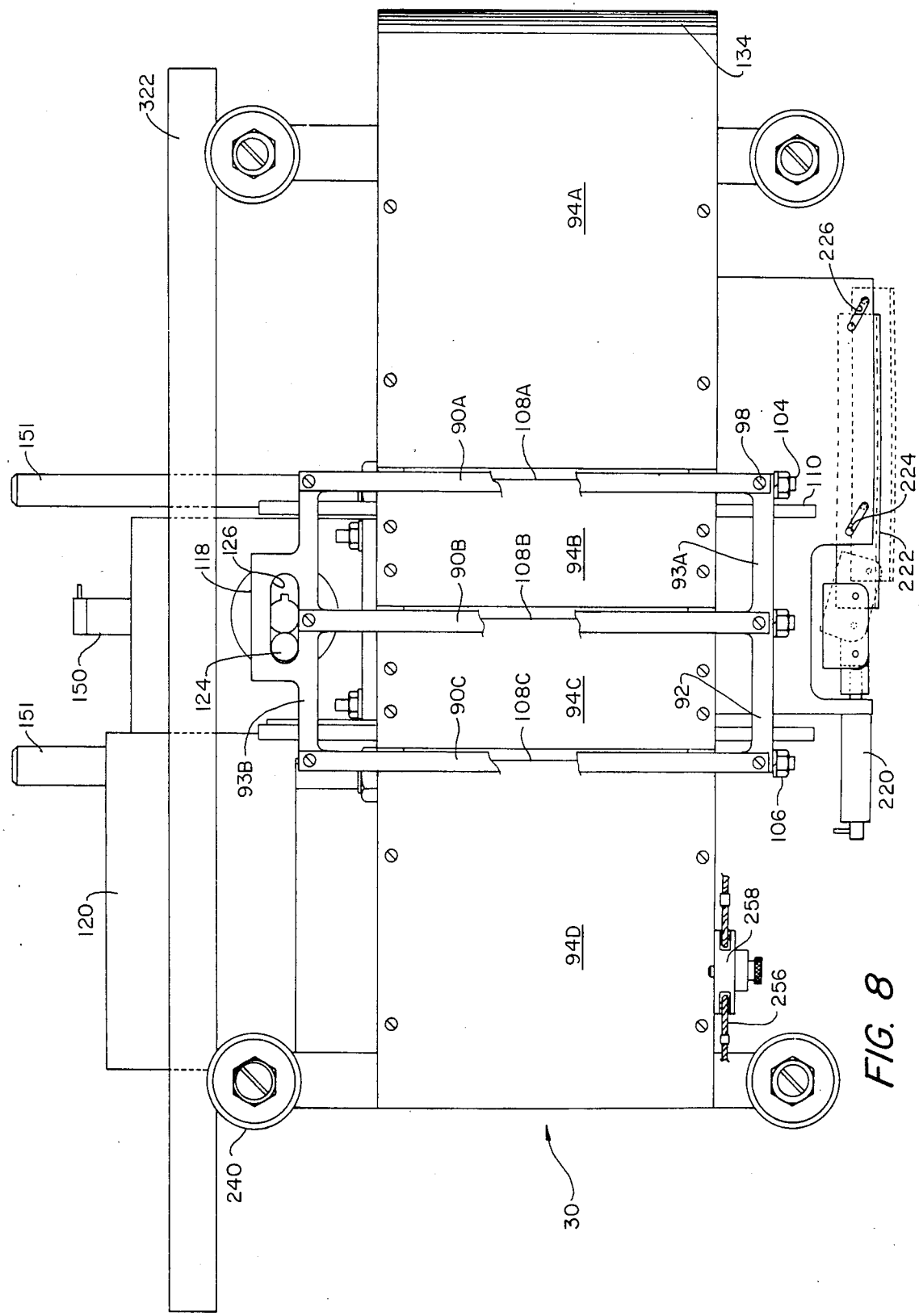
FIG. 8 is a plan view of the carriage.
Figure 9:
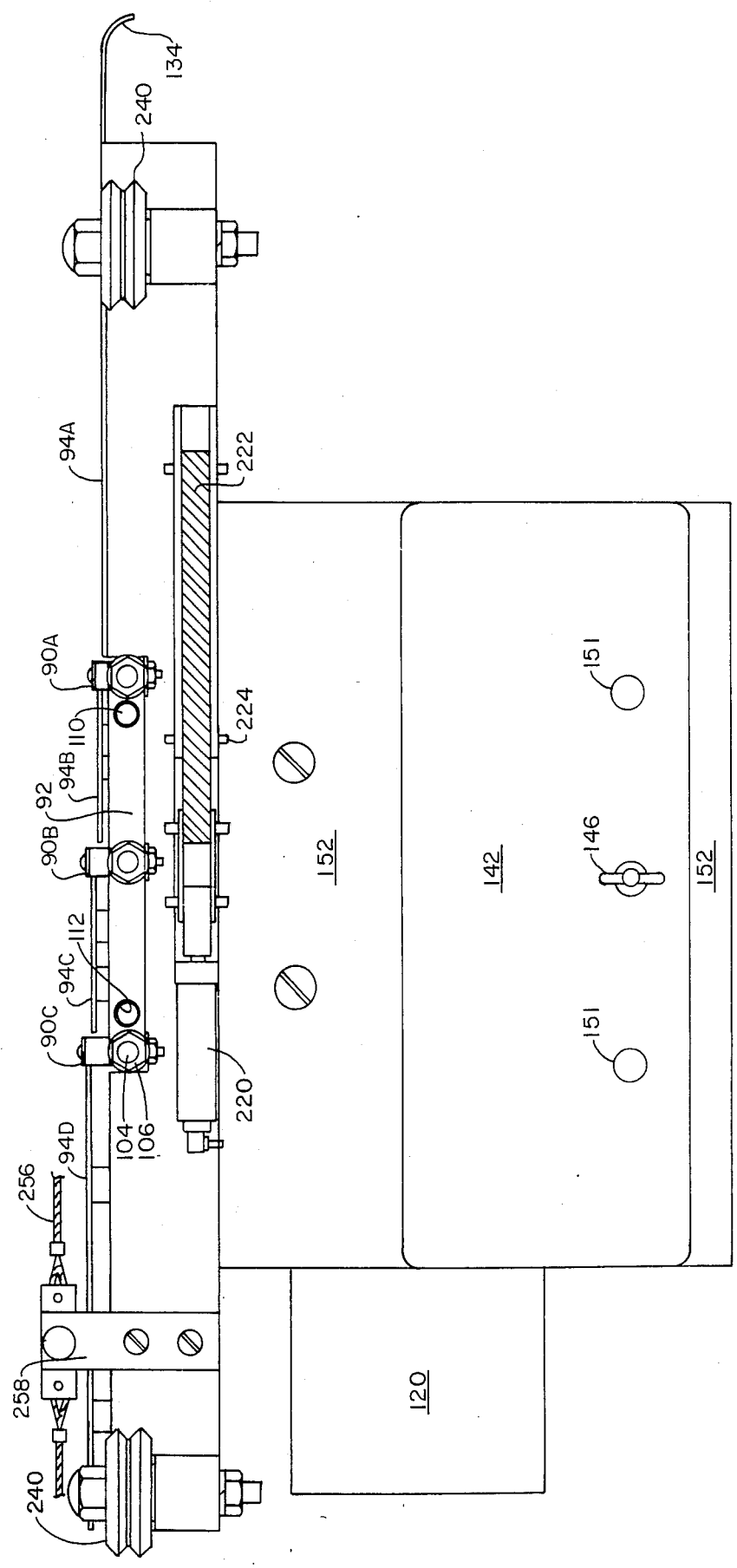
FIG. 9 is a front elevation of the carriage.

Referring now to FIGS. 8 and 9, additional aspects of the means for dispensing solid sandwich fillers from cannisters 24 are now described. A plurality of cutting blades 90A, 90B and 90C are affixed to a holder 92. Blades 90A-C are arranged to cut individual slices of solid sandwich filler as the carriage 30 passes beneath a selected first cannister 24 whose door 36 has been opened to expose the solid sandwich filler. As shown in FIG. 9, cutting blades 90A-C are affixed to holder 92 so that cutting blades 90A-C are located at progressively higher levels. Carriage 30 has a table comprising four vertically displaced sections 94A, 94B, 94C and 94D. Blades 90A, B and C rest on and are supported by table sections 94 B, C and D respectively.

The relative vertical spacing between the cutting blades 90A-C may be precisely varied as desired using selectively sized spacers 96 through which screws 98 pass for fastening the cutting blades to holder 92. This capability to precisely adjust the vertical position of cutting blades 90 insures that the thicknesses of each slice of solid sandwich filler may be controlled to within 1/16 ounce of a desired weight.

A blade tensioner is provided for each of the cutting blades 90A-C. Each tensioner includes a threaded shaft 104 that is received in a hole in one end of holder 92, a nut 106 screwed onto shaft 104 and engaged with holder 92, and screw 98 that is affixed to shaft 104 and extends through an elongated hole in holder 92. Screw 98 also projects through a hole in one end of the associated cutting blade 90A-C. Adjustment of the nut 106 moves shaft 104 relative to holder 92 and thus adjusts the tension of the associated cutting blade 90A-C.

The vertically-displaced table sections 94A-D form openings 108A-C (FIG. 8) below the cutting blades 90A-C respectively. Openings 108A-C permit slices of solid sandwich filler to drop onto a sandwich facing on the carriage 30. The number of cutting blades 90 and the sizes of the corresponding openings 108 can be varied to meet the requirements of sandwich facing placement, the number of slices of solid sandwich filler desired, and the solid sandwich filler composition.

Cutting blade holder 92 has two opposite end members 93A and B (FIG. 8) having openings 112 in which are slidably received rails 110. The latter are affixed to carriage 30. Rails 110 permit reciprocal movement of the holder 92 in a direction transverse to the path along which the carriage travels.

As seen in FIG. 8, holder 92 is reciprocally driven by a knife drive means comprising a spindle 118, rotatably driven by an electric motor 120 via a transmission 122, a cam 124 eccentrically attached to spindle 118 for rotation therewith about an orbital path concentric with but spaced from the axis of the spindle, and a cam follower aperture 126 formed in end member 93B of holder 92 and sized to receive the cam 124. The sizes and positions of cam 124 and follower 126 are arranged so that rotational movement of the electric motor 120 is translated to reciprocal movement of the holder 92 parallel to the lengths of blades 90A-C.

As seen in FIG. 8, support table 94 of carriage 30 includes on opposite ends of holder 92 an entry station represented by table section 94A and an exit station represented by table section 94D. Table section 94A has a downwardly curved leading edge 134. As carriage 30 approaches a selected first solid filler cannister means 24, the door 36 of the selected first cannister means is opened so as to allow solid sandwich filler to drop onto the entry station 94A. The curved leading edge 134 is provided to facilitate engagement of the solid sandwich filler by the top surface of table section 94A. Continued travel of the carriage 30 along the path next brings the selected solid sandwich filler into contact successively with cutting blades 90A-C, causing successive slices to be cut and deposited via openings 108A-C onto the sandwich facing supported by tray 140. Continued movement of carriage 30 causes the solid filler to be positioned on and supported by table section 94D, at which point the associated door 36 is closed to force the solid sandwich filler back up into first cannister 24. Each cannister 24 has a pair of tracks 38 formed in opposite side walls of first cannisters 24. The doors 36 are arranged and operated so that their inclined leading edges 48 (FIGS. 5-7) move out of contact with tracking table section 94D just after door 36 is moved to its closed position.

Figure 4:
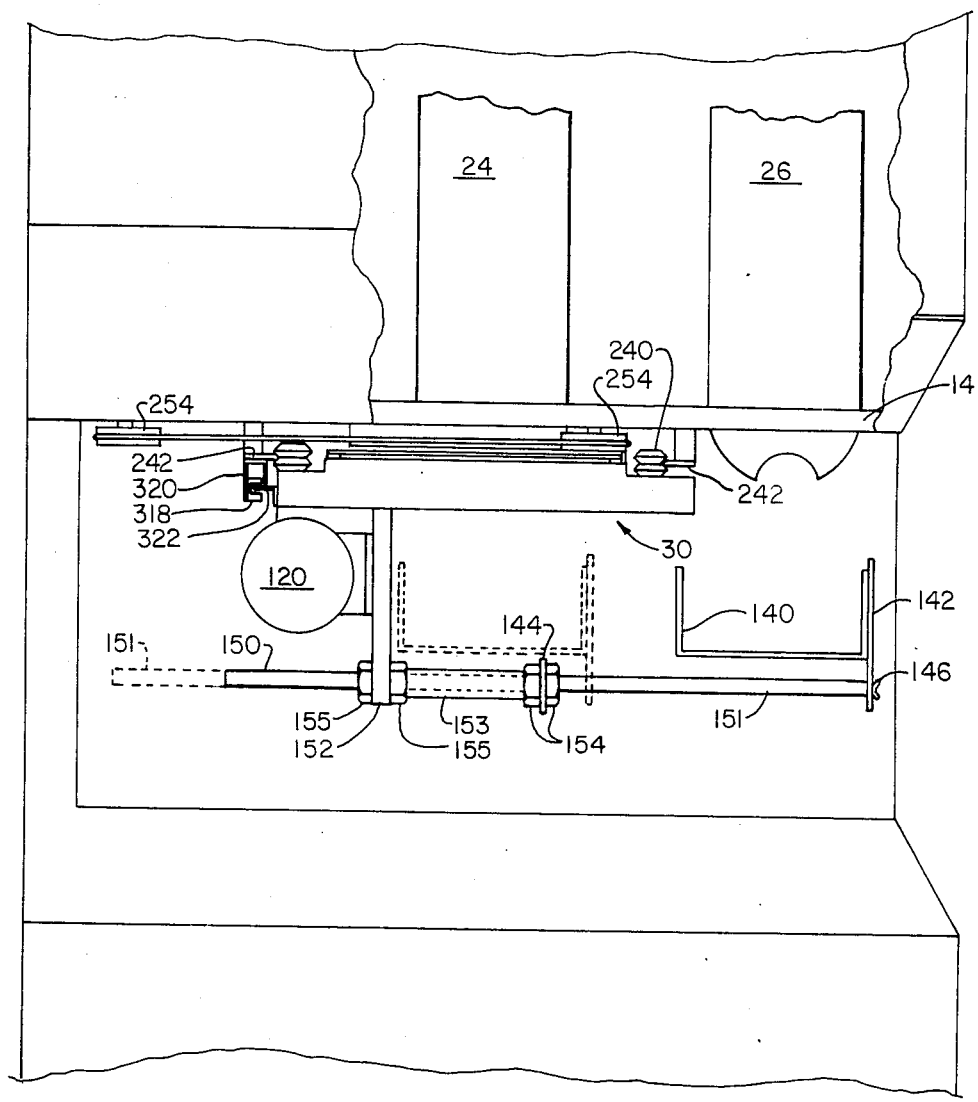
FIG. 4 is a side elevation, with certain portions broken away, showing the relationship of the cannisters to the carriage and to the horizontal base, and indicating the two positions of the sandwich facing support tray.
Figure 10:
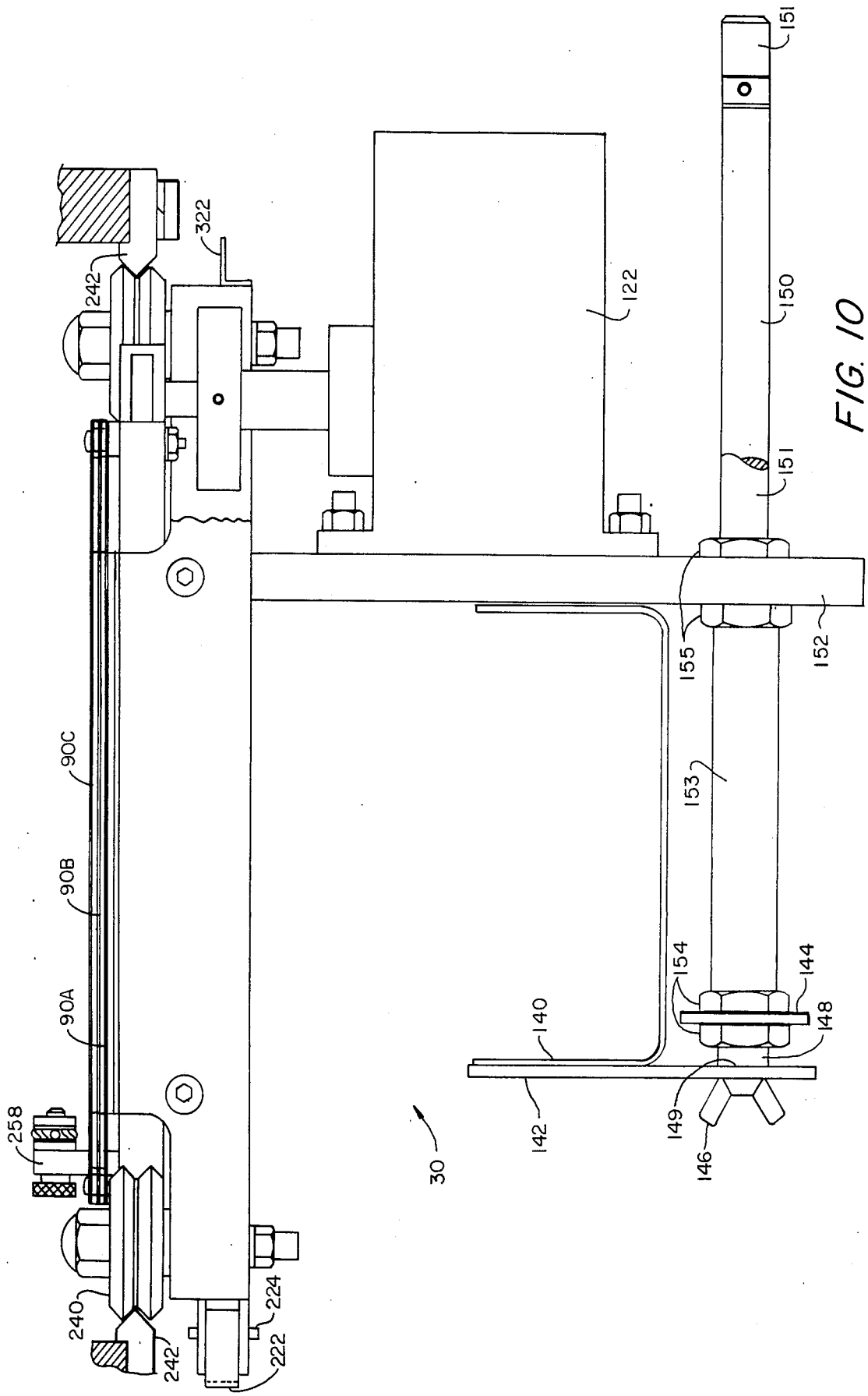
FIG. 10 is a side elevation of the carriage.

Considering now FIGS. 4, 9 and 10, the sandwich facing is supported on a tray 140 secured to a plate 142 that is welded or otherwise affixed to the ends of two parallel support rods that are slidably mounted within two parallel hollow tubes 153. Each tube 153 extends through and is affixed at one end to a plate 144 and at the opposite end to a bracket 152 that is affixed to and depends from carriage 30. The opposite ends of each tube 153 are threaded to receive two pairs of nuts 154 and 155 which serve to lock the tubes to plate 144 and bracket 152. The plate 142 and support rods 151 form a discrete unit that is movable lengthwise of tubes 153. Selective telescoping movement of that unit is achieved by an arrangement consisting of a pneumatic actuator 150 that is secured to plate 144 and bracket 152. The outer or free end of piston rod 148 of actuator 150 has a reduced diameter, extends through a hole in plate 142 and is threaded to receive a wing nut 146. Tightening nut 146 draws plate 142 tight against a shoulder 149 on the piston rod. Pneumatic actuator 150 is arranged so that as its piston rod 148 is retracted and extended, tray 140 will move from a first position beneath the first row of apertures (as shown in phantom view in FIG. 4) to a second position beneath the second row of apertures (as shown in solid view in FIG. 4).

Tray 140 may be sized to carry different sandwich facings including Pullman bread and sliced bulky, submarine or hoagie bread and rolls. Typical dimensions of tray 140 range from 4" by 8" wide (measured sideways as seen in FIG. 4) to 5" to 12" long (measured sideways as viewed in FIG. 9), so as to be able to carry two slices of Pullman bread (usually measuring 4" by 4" ) and submarine rolls (usually measuring up to 12" long). Of course, the dimension of tray 140 may be changed according to the size, number and positioning of the sandwich facing(s) on tray 140.

Referring next to FIGS. 3, 5 and 7, cannisters 24 are located in fixed position relative to apertures 18. For that purpose, and also to provide means for releasably locking the cannisters in place, cannisters 24 have pegs 158 attached to opposite sides thereof. Pegs 158 fit in depressions 160 (FIGS. 3 and 5) formed in horizontal base 14. Locking bars 162 (only several of which are shown in FIG. 3) are slidably attached to the upper surface of horizontal base 14 adjacent the two sides of the first cannisters 24 on which the pegs 158 are attached. Locking bars 162 have edge slots 164 along one or both side edges. For installation or removal of a first cannister 24, bars 162 are moved to align slots 164 with depressions 160, thereby allowing pegs 158 to be inserted or removed from depressions 160. For locking the cannisters in place, bars 162 are shifted longitudinally so as to move slots 164 out of alignment with depressions 160 and pegs 158.

As seen in FIG. 5, locking bars 162 have elongated holes 168 through which extend the shanks of screws 166 that are received by threaded openings in base 14. The heads of screws 166 hold bars 162 flat against base 14 while allowing the latter to be moved lengthwise to the extent permitted by elongated holes 168.

Looking now at FIGS. 3, 4, 11 and 12, the second cannisters 26 are positioned above the second apertures 18 of the second row. These second cannisters 26 are designed to store loose sandwich filler, such as tuna fish salad, sliced pickles, or shredded lettuce. Cannisters 26 have like pegs 158 that reside in depressions 160 in base 14, and are secured to horizontal base 14 by locking bars 162.

Referring now to FIGS, 4, 9, 11 and 12, loose sandwich filler is dispensed by feed wheels 180 mounted within the bottom end of the cannister. Four circularly curved recesses 182 are formed in the peripheral surface of the feed wheel 180, so creating four alternately disposed drive sections 184. The number and shape of recesses 182 is a matter of design, dependent upon the desired feed rates, positioning of sandwich facing on the carriage 30, and composition of loose sandwich filler dispensed. Each feed wheel 180 is mounted for rotation on an axle 186 that extends parallel to the row of apertures 18. Each axle extends through opposite side walls of the associated cannister 26. Each side wall of each cannister 26 preferably has a thickened wall section 188 through which the axle 186 extends. Each feed wheel 180 is keyed to its associated axle 186 by a pin 185 that is affixed in one end of the axle and is received diametrically-opposed recesses in the adjunct end of the feed wheel. Pin 185 acts to cause feed wheel 180 to rotate with axle 186. Axial movement of feed wheel 180 on axle 186 is prevented by a spring loaded detent pin 189 that is sized and positioned to engage a peripheral groove 191 formed in the outer surface of axle 186 intermediate its ends. Pin 189 is located in a radial bore 193 formed inside feed wheel 180, and pin's 189 inner end is shaped to extend into groove 191 so as to prevent axial movement of the feed wheel.

Figure 11:
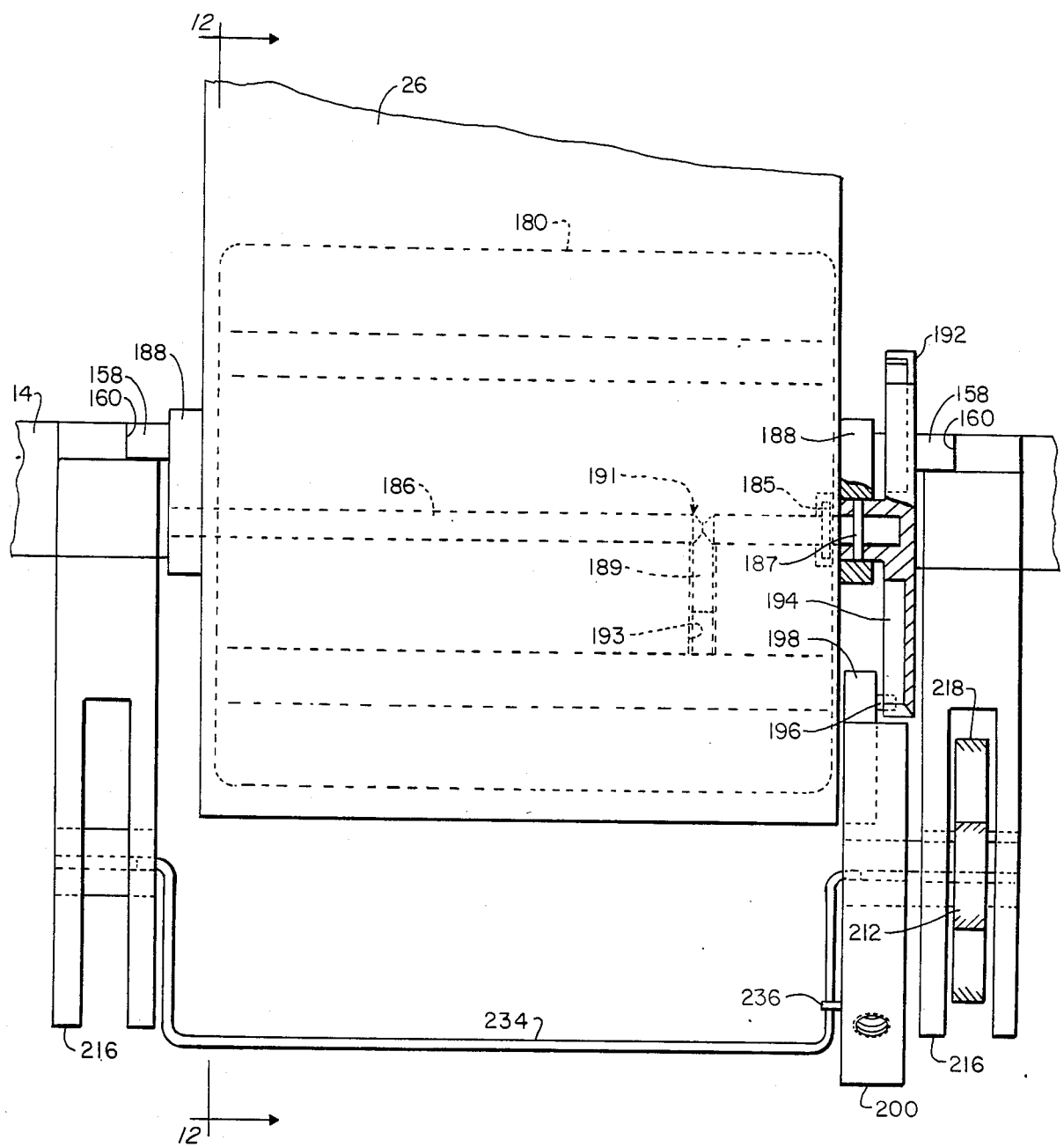
FIG. 11 is a sectional view in front elevation illustrating details of the feed wheel assembly and associated drive means of a cannister for containing loose filler material.
Figure 12:
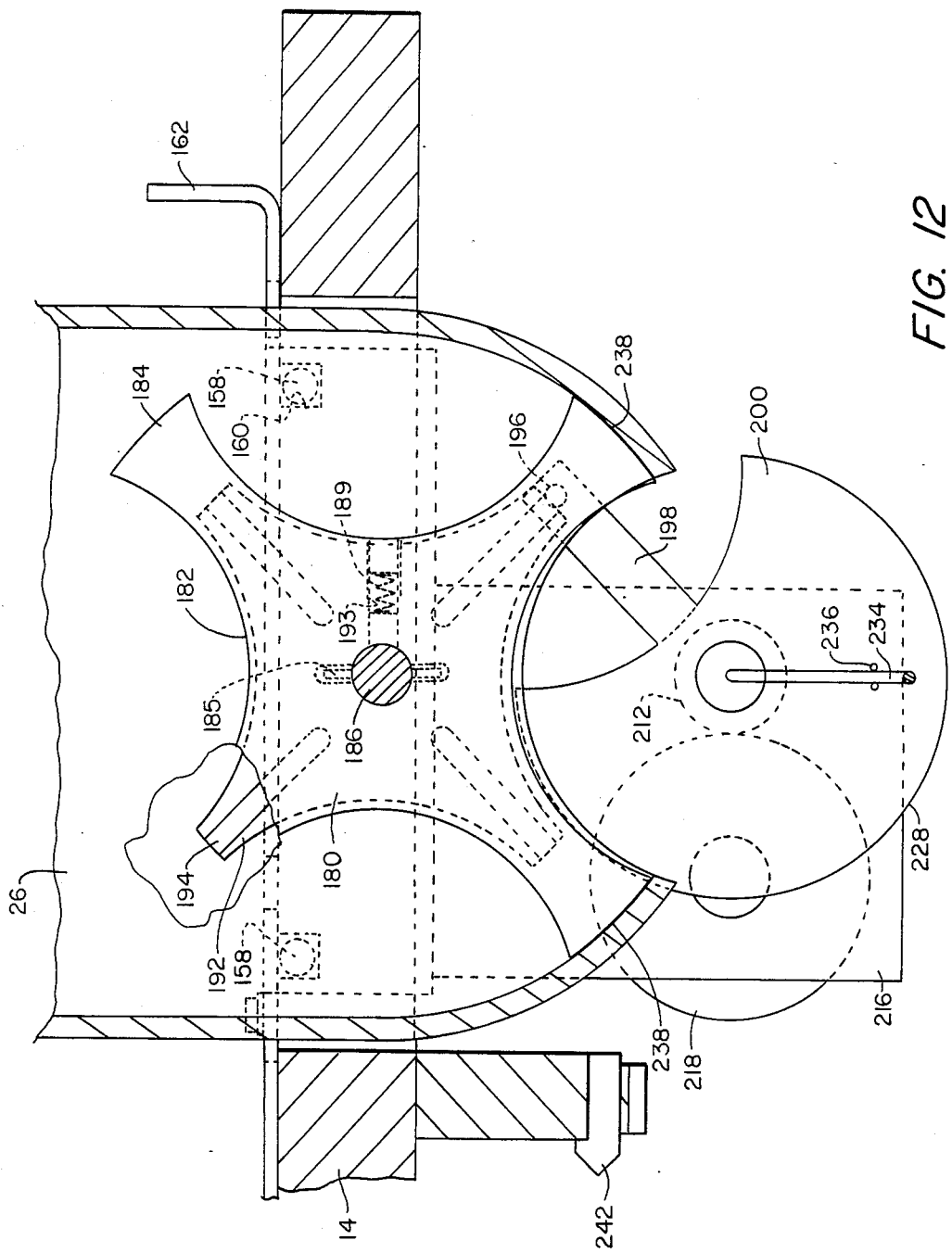
FIG. 12 is a sectional view taken along line 12—12 of FIG. 11 showing other details of the feed wheel assembly and drive means.

Each feed wheel 180 is rotatably driven by feed wheel drive means hereinafter described. As seen in FIGS. 4, 8, 9, 11 and 12, each feed wheel drive means preferably comprises a Geneva drive that includes a star wheel 192 (FIG. 11) having a plurality of radial follower slots 194 (FIG. 12) each sized to slidably receive a drive pin 196 (FIGS. 11 and 12) mounted on an arm 198 attached to a driver 200. Star wheel 192 is affixed to axle 186 by a pin 187. Drive pin 196 enters and exits the ends of follower slots 194 closest to the peripheral circumferential surface of driver 200. Each driver 200 is affixed to a first pinion gear 212 (FIG. 11) for rotation therewith, said first pinion gear 212 being supported for rotation in a bushing 214 mounted in bracket 216 (FIG. 11). Each bracket 216 is attached to the base 14 adjacent the bottom end of each second cannister 26. A second pinion gear 218 (FIGS. 11 and 12) is rotatably mounted in a bracket 216 attached to base 14 for the purpose of driving the associated first pinion gear 212. Each second pinion gear 218 is selectively driven by means (not shown) so as to provide for proper operation of the machine, as hereinafter described.

Operation of the several feed wheel drive means is determined by a mechanism that comprises a double action pneumatic actuator 220 attached to and movable with carriage 30, a gear toothed rack 222 affixed to the piston rod of actuator 220, at least a pair of guide pins 224 affixed to rack 222 and slidably disposed in at least a pair of angularly disposed slots 226 formed in carriage 30. When actuator 220 is operated so that its piston rod is extended, rack 222 will move outwardly away from carriage 30, and as the actuator's piston rod is retracted, rack 222 will move toward carriage 30.

Referring now to FIGS. 8 and 9, the drive for each second cannister 26 operates in the following manner: As carriage 30 approaches a selected second cannister 26, pneumatic actuator 220 is operated so as to extend its piston rod, whereupon rack 222 is moved outwardly (to the position shown in phantom in FIG. 8) and engages and drives the second pinion gear 218 associated with that cannister, as a consequence of the relative movement between the carriage 30 and gear 218. As it rotates, pinion gear 218 will drive pinion gear 212 which in turn drives the associated driver 200 and arm 198 in a circular path. The circular movement causes pin 196 to enter, slide along, and exit a radial follower slot 194. This engagement of pin 196 with star wheel 192 causes the latter to rotate, which in turn drives the associated feed wheel 180.

It is to be noted that the outer peripheral surface 228 of driver 200 is circularly curved. Just before the pin 196 enters a radial follower slot 194, the leading edge of outer surface 228 enters and moves in sliding contact with correspondingly shaped recesses 182 formed in star wheel 192. This sliding engagement between the outer surface 228 of driver 200 and the recess 182 assures that a radial follower slot 194 of star wheel 192 is always positioned for receipt of pin 196.

Because pin 196 exits and enters successive follower slots 194 of star wheel 192, engagement of rack 222 with pinion 218 will cause feed wheel 180 to be driven intermittently with alternating rotation and dwell cycles. During each rotation cycle, loose sandwich filler is picked up by a first recess 182 approaching the 12 o'clock position and simultaneously loose sandwich filler is dispensed onto a sandwich facing carried by tray 140 by a second diametrically opposed recess 182 approaching the six o'clock position.

Associated with each cannister 26 is a U-shaped wiper 234 (FIG. 11). Each wiper 234 has one end attached to a driver wheel 200 and a second end rotatably mounted in a bushing (not shown) disposed in the bracket 216 associated with the adjacent aperture 18. For the sake of clarity in FIG. 11, first pinion gear 212 and second pinion gear 218 are omitted from the leftmost bracket 216. Wiper 234 can be made of metal wire, rubber, or other suitable material. Preferably, as shown, wiper 234 is a metal wire. A pair of pins 236 mounted on driver wheel 200 captivate wiper 234 so that it will rotate with the driver wheel 200. Wiper 234 is continuously driven by the driver 200. During the dwell cycle, wiper 234 enters a recess 182 and wipes off remaining loose sandwich filler for deposit onto the sandwich facing. No additional loose sandwich filler is dispensed during the dwell cycle, as the junction of the drive sections 184 of feed wheel 180 and the adjacent dispensing walls 238 of the cannister 26 acts as a barrier to release of filler.

Figure 13:
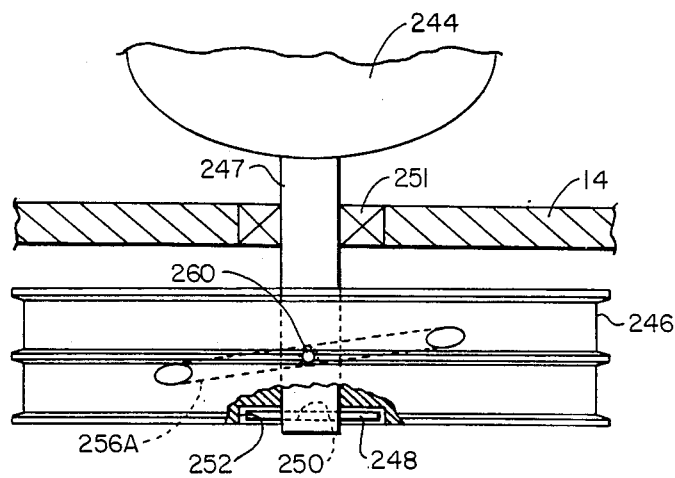
FIG. 13 is a sectional view in front elevation taken along line 13—13 of FIG. 3 showing details of the capstan and capstan drive motor.
Figure 14:
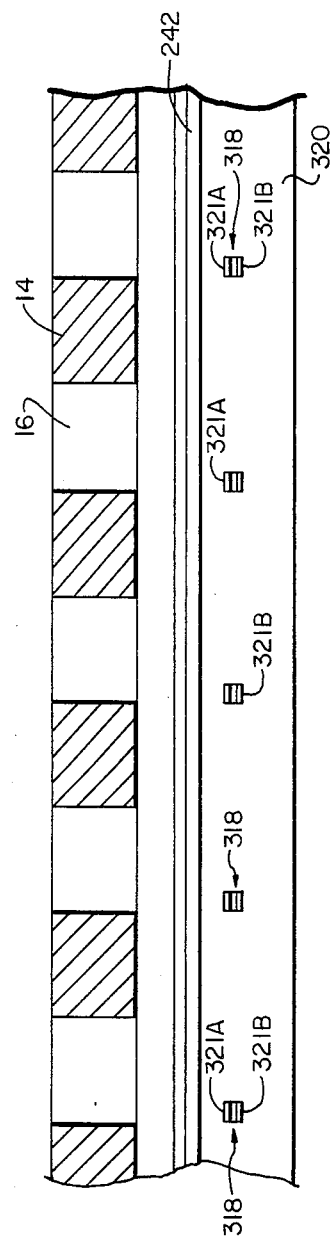
FIG. 14 is a fragmentary sectional view in front elevation showing the location of the optical sensing means.

Referring now to FIGS. 3, 4, 8-11 and 13, additional details of the carriage 30 and of the drive means for moving the carriage 30 along the path are now described. Carriage 30 has grooved guide rollers 240 attached thereto for supporting it for movement on fixed guide rails 242. As seen in FIG. 3, guide rails 242 are affixed to the underside of base 14 in straddling relationship to the row of first apertures 16. The drive means for moving the carriage 30 along the guides 242 includes an electric motor 244 affixed to the upper side of base 14. A capstan 246 on the underside of base 14 is affixed to the output shaft 247 of electric motor 244. To provide overload protection for the electric motor 244, a shear pin 248 is positioned in a diametrically-extending hole 250 in the output shaft 247 and received in an elongated diametrically-extending groove 252 formed in the underside of capstan 246. Shear pin 248 causes the capstan to rotate with shaft 247. Bearings 251 permit free rotation of the output shaft 247. Three pulleys 254, each rotatably mounted at various positions on stub shafts attached to and depending from horizontal base 14 coact with capstan 246 to support a cable 256. The opposite ends of cable 256 are attached to carriage 30 via an anchor member 258 (FIG. 8). As seen in FIG. 13, a portion 256A of cable 256 extends through a hole in the interior of the capstan 246, the hole in the capstan extending along a chord of the circle determined by the outside diameter of the capstan. Cable portion 256A is secured by set screw 260 that is secured into a threaded opening in the capstan. Thus, actuation of electric motor 244 will rotate capstan 246 so as to cause cable 256 to move the carriage 30 along guide rails 242.

Figure 2:
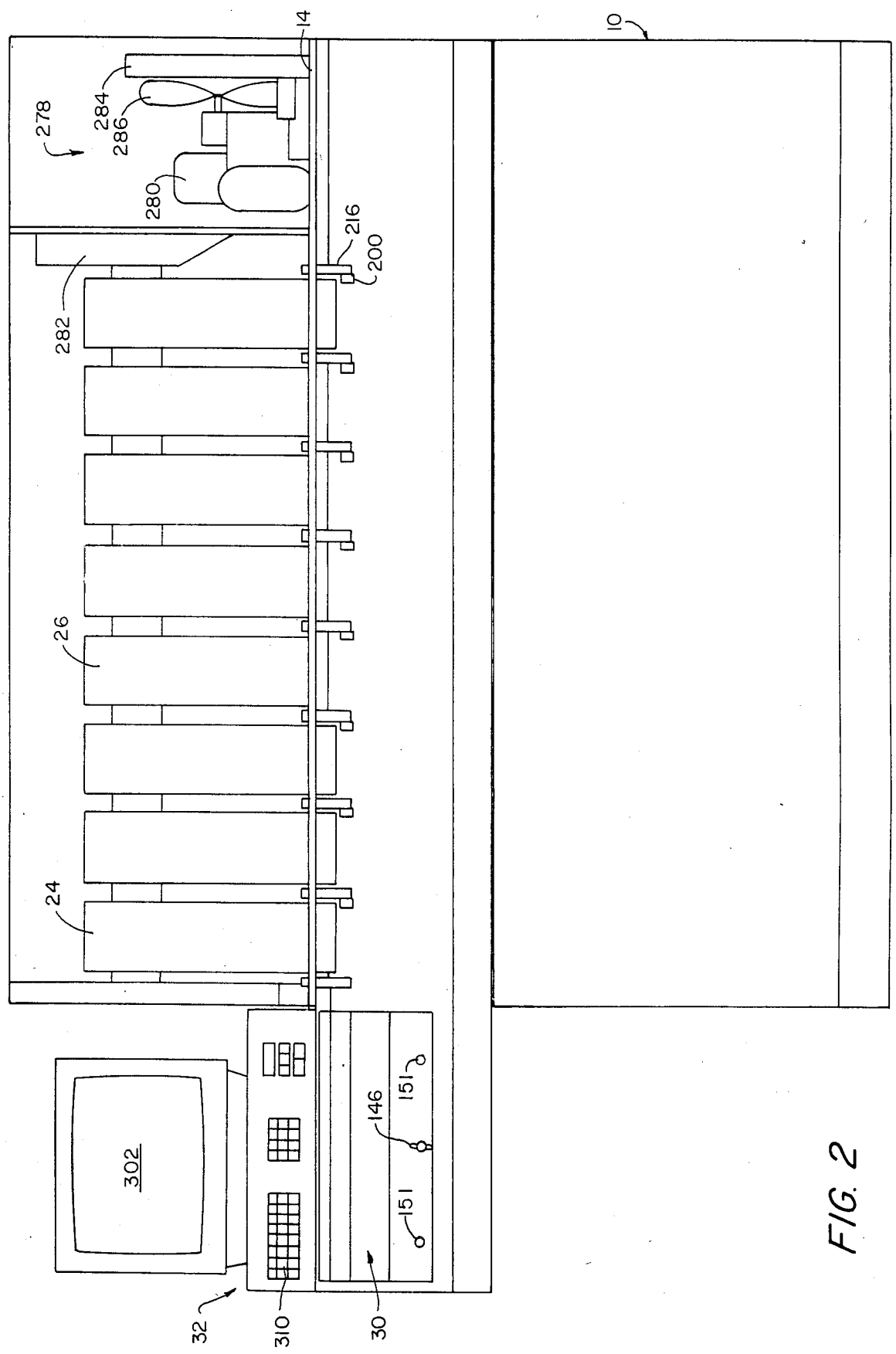
FIG. 2 is identical to FIG. 1 except that portions of the enclosure have been removed so as to expose the cannisters and the refrigeration system.

Turning now to FIGS. 1, 2 and 3, a housing or enclosure 268 encloses horizontal base 14, cannisters 24 and 26, and other portions of the machine located adjacent the cannisters 24 and 26 and above the horizontal base 14. Enclosure 268 includes a first upper door 270 hinged along its upper edge to permit access to cannisters 24 and 26 from the front of the machine ("front" being defined as the surface of the machine shown in elevation in FIG. 1). Enclosure 268 also includes a second lower door 272 hinged along its bottom edge to permit access to elements of the machine immediately adjacent to horizontal base 14. For convenience of illustration in FIG. 2, doors 270 and 272 and a portion of enclosure 268 surrounding the refrigeration system 278 has been removed.

Refrigeration system 278 is mounted on horizontal base 14 and, as seen in FIGS. 2 and 3, comprises a compressor 280, an evaporator 282, a condenser 284 and a condenser-cooling fan 286. Another fan (not shown) is employed to force air through the evaporator 282, thereby circulating refrigerated air through the space enclosed by base 14 and enclosure 218. Hence, the refrigeration system serves to maintain the space within enclosure 268 at a preselected temperature so as to prevent spoilage of the sandwich filler contained by cannisters 24 and 26.

Referring now to FIGS. 4, 5 and 14-16, the pneumatic circuitry and attendant electronic controls of the machine will be described. For convenience of illustration, certain of the pneumatic flow controls have been omitted from FIGS. 1-14 but are included in FIGS. 15 and 16.

Figure 15:
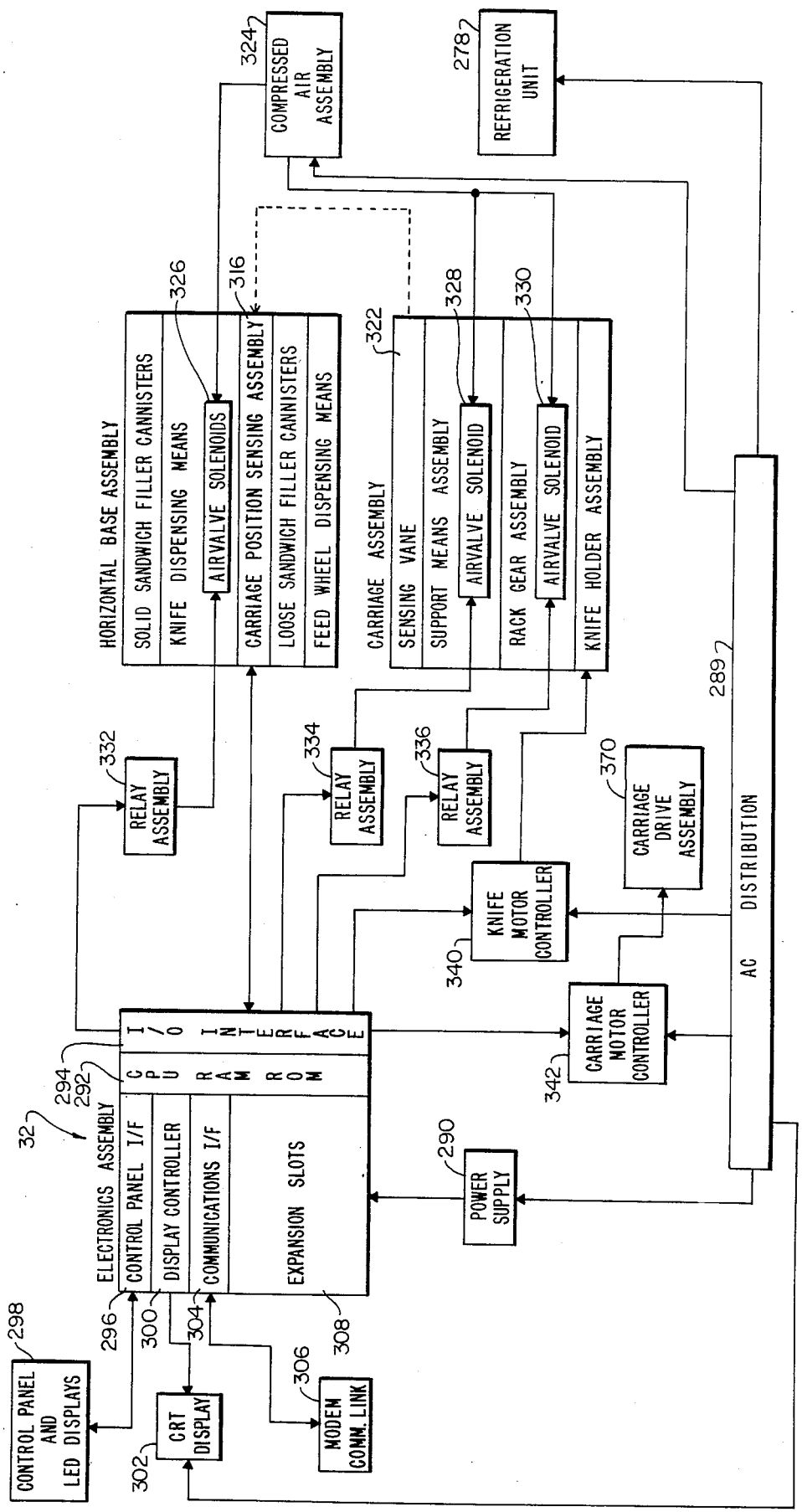
FIG. 15 is a system block diagram showing the electrical and pneumatic control means of the preferred embodiment of the invention.

As seen in FIG. 15, a controller 32 is provided for controlling the operation of the various elements of the invention. Power is supplied to controller 32 from an AC source 288 via a power supply 290. Controller 32 may take various forms, but preferably it is a computer of the type used to control machine operation and includes memory/logic unit 292 having a CPU, RAM and a ROM. An input/output ("I/O") interface unit 294 tied to the memory/logic unit 292 is provided for receiving and transmitting informational signals. Power is also supplied by the I/O unit 294 to selected elements. A control panel interface 296 is used to connect memory/logic unit 292 with a control panel having associated light emitting diode ("LED") displays 298. Controller 32 also has a display controller 300 that ties the memory/logic unit 292 to a cathode ray tube ("CRT") display 302 (see FIGS. 1 and 15). Controller 32 also may have a communications interface 304 that permits the connection of remote informational source, via a modem communications link 306, to the memory/logic unit 292. Controller 32 may have expansion slots 308 for expansion of memory capacity, addition of chip sets, or other modification of the control means.

Controller 32 can be programmed via control panel 298 to cause the machine to be operated so as to produce sandwiches containing different combinations of the selected sandwich fillings stored in the cannisters 24 and 26. Each specific sandwich filling may be represented by a specific key on a keyboard 310 (FIG. 1) that forms part of or is associated with control panel 298. As an optional measure, controller 32 may be pre-programmed so as to provide for selection of specific sandwich combinations, e.g., a ham, cheese and lettuce sandwich, selected by depressing a single specific key on keyboard 310 to access a subroutine in the controller 32 containing the needed instructions to operate the sandwich machine in the manner required to supply the selected sandwich combination. A start button on the keyboard is required to be depressed to initiate operation of the machine to cause it to operate in accordance with the selected sandwich combination. A clear button on the keyboard allows the operator to erase a selected combination and to program in a new sandwich combination. The CRT 302 is used to display the combination of sandwich fillings selected and/or to display the operational state of the machine.

To properly control operation of the machine 10, controller means 32 must be supplied with information regarding the position of the carriage along the path. Accordingly, carriage position sensing means 316 (FIG. 15) are provided. As seen in FIGS. 4, 5, 14 and 15, sensing means 316 comprise a plurality of optical sensor units 318 mounted on a U-shaped bracket 320 attached to the underside of the horizontal base 14. Each optional sensor unit comprises a light source 321A and a light detector 321B. Optical sensor 318 is positioned in a selected position adjacent a different one of the first apertures 16. An opaque vane 322 (FIGS. 8 and 10) is attached to and movable with carriage 30, so that as carriage 30 moves along rails 242, vane 322 will intrude into each optical sensor unit 318 in turn, thus blocking the light beams from source 321A. Blockage of the light beam of a sensor unit 318 triggers the opening of an electric circuit causing the detector of the sensor unit 318 to send a signal to controller 32 indicative of the carriage being in a predetermined position.

As seen in FIG. 5, each optical sensor unit 318 is attached to the longer leg 320A of a U-shaped bracket 320. The shorter 320B is sized to guide the vane 322 into the space between the light sources 321A and the light detectors 321B of optical sensors 318 (it is to be noted that in FIG. 14, the short leg 320B has been removed for convenience of illustration). The signal line connecting the I/O interface 294 and carriage position sensing means 316 has double arrows indicating that each optical sensor unit 318 supplies a signal to and receives power from the I/O interface 294. In FIG. 15, the line connecting vane 322 with the optical sensing means 316 is dotted so as to indicate that no direct mechanical or electrical connection exists between vane 322 and the sensor units 318. The same result may be achieved by mounting a plurality of vanes 322 on frame 12 and a sensor 318 on carriage 30.

Referring now to FIGS. 3 and 15, an air compressor 324 is mounted on horizontal base 14. Compressor 324 is used to supply compressed air to the pneumatic actuators 72, 150 and 220 used to move respectively the levers 50, the tray 140 and the rack gear 222. Controller 32 also controls operation of a plurality of solenoid actuated air valves 326, 328 and 330 (FIG. 15) which are associated respectively with pneumatic actuators 72, 150 and 220. These solenoid valves are four-way valves operable to establish two different states. In a first state, compressed air is supplied to a first end of one of the pneumatic actuators 72, 150 and 220 and air is exhausted from the second opposite end of the same actuator through a first exhaust port in the solenoids 326, 328, and 330. In the second state, compressed air is supplied to the second end of the actuators 72, 150, and 220 and air is exhausted from the first ends of the same actuators through a second exhaust port in the solenoids 326, 328 and 330. Upon receipt of an enable signal from the controller 32, selected ones of the solenoid valves 326, 328 and 330 are actuated so as to direct compressed air to selected ones of pneumatic actuator cylinders 72, 150 and 220, thus actuating a selected lever 50, or shifting the tray 140 or causing movement of rack 222. Relay assemblies 332, 334, and 336 coact with I/O interface 294 to control energization of the solenoids of valves 326, 328, and 330.

A knife motor controller 340 and a carriage motor controller 342 selectively supply power to knife motor 120 and carriage drive motor 244 in response to enable control signals from the controllers 340 and 342 generated under control of an enable signal from the controller 32.

Figure 16:
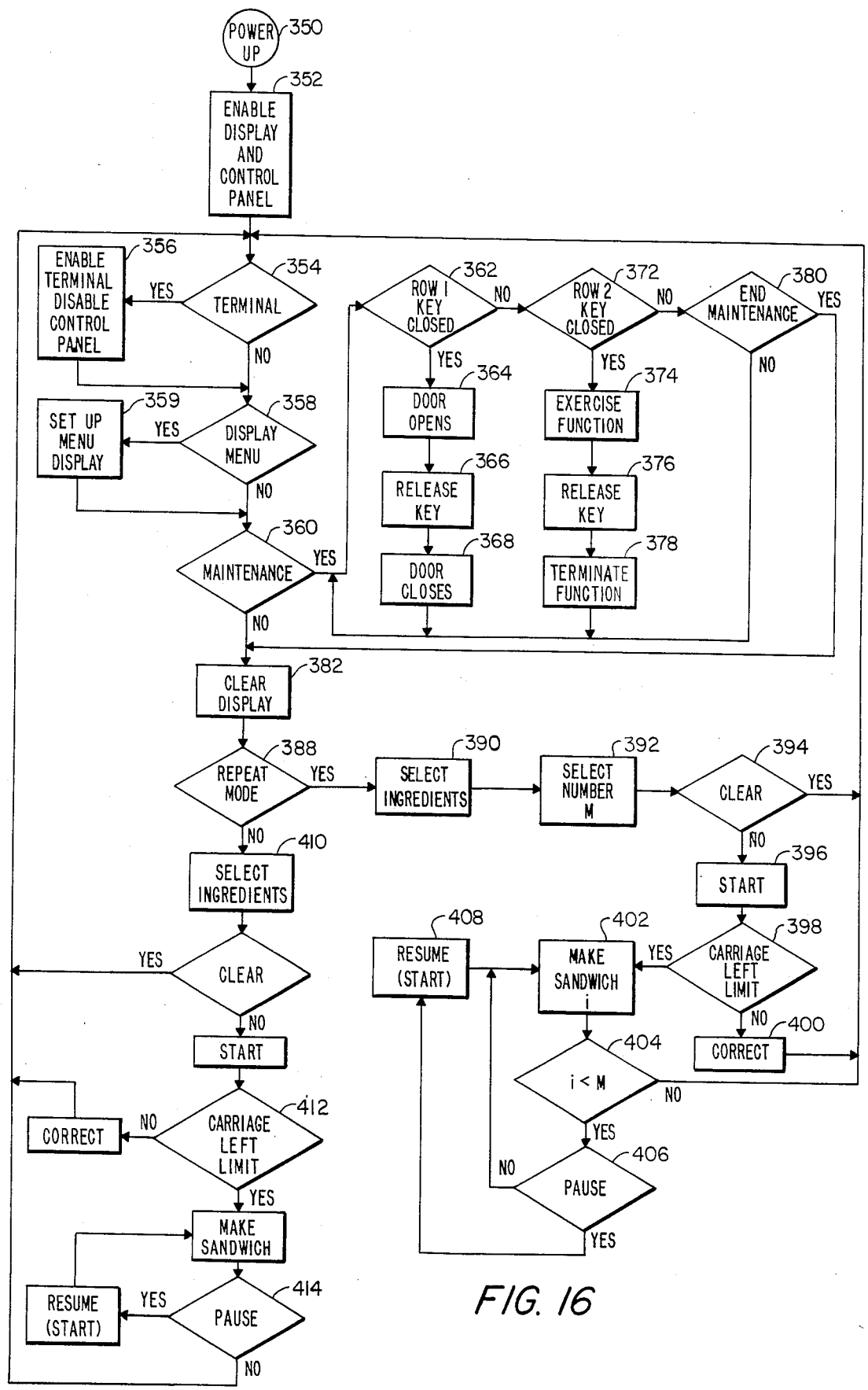
FIG. 16 is a software flow chart illustrating the steps followed by the control means in controlling operation of the machine.

Referring now to FIG. 16, a flow chart is shown setting forth the various steps the software program follows in directing the operation of the control means 32. Conventional flow chart symbology is used. A diamond-shaped figure represents a decision box where a question is presented. If the question if answered in the affirmative, the "Yes" path is followed. If answered in the negative, the "No" path is followed. Prompters (not shown) are provided asking which path is desired. Assigned to each decision box is a combination of keys which are depressed to represent either an affirmative or a negative answer to the question posed by the prompter. Rectangular boxes are used to represent action boxes where a specific step or function is performed. The following description of each step in the flow chart will illustrate the symbological significance of the decision and action boxes.

As a first step 350, power is supplied to the control panel 298 and the CRT display 302. As step 352 indicates, this enables the control panel 298 and the CRT display 302. Next, a decision step 354 is reached where, if desired, a microcomputer can be enabled to control operation of the machine. If the microcomputer is used, data is inputted using a terminal (not shown), and so at step 356 the control panel 298 is disabled.

Regardless of the decision made at step 356, at the next decision box 358 it must be determined whether a menu listing the sandwich fillers carried in the first cannisters 24 and the second cannisters 26 will be displayed on the CRT 302. If such a display is desired, at the next step 359 the specific type of sandwich filler stored in each cannister 24 and 26 is entered using the terminal or at the control panel 298.

At the following step 360, a maintenance mode can be entered where the various functions performed by the machine in sequence can be isolated and made to perform one at a time. This mode is typically selected when it is desired to move the elements of the machine into a position where a selected maintenance or other operation is to be performed on the element. Generally, the control panel 298 is used to control the machine 10 when operated in the maintenance mode. An assignment of keys is made where one key is provided for controlling the function of each discrete element of the invention. For instance, at the decision box 362 one key in row one of the keyboard 310 can be assigned to control the opening and closing of one of the doors 36. While the key is closed or depressed, the door is held open, as indicted at step 364. When the key is released at step 366, the door closes, as represented by step 368. If it is desired to selectively cause other elements of the machine to function, such as the carriage drive means 370, at step 372 a specific key in the second row of the keyboard 310 is employed. At step 376 the selected function occurs. Upon release of the key at step 376, the function terminates, as represented at step 378. To exit from the maintenance mode, an affirmative answer is entered at decision step 380. At step 382 diagnostic messages which were displayed on CRT 302 during the maintenance mode are cleared.

When it is desired to produce a plurality of sandwiches all having like sandwich filler, an affirmative answer is entered at step 388 causing entry into the repeat mode. In the repeat mode, the combination of sandwich fillers desired is entered at step 390. The number of sandwiches desired, M, is selected at step 392. If a mistake is made in the selection of sandwich filler or number of sandwiches desired, at step 394 an exit from the repeat mode can be made allowing subsequent reentry of the proper information. If the sandwich filler and number information is correct as entered, the machine is activated at step 396. Before a sandwich is actually produced, a check is made at step 398 to determine if the carriage 30 is in the proper position for beginning the sandwich making sequence. If it is not, the repeat mode is exited and diagnostic information is displayed on the CRT 302 at step 400 suggesting steps for properly positioning the carriage 30. If the carriage 30 is in the proper position, at step 402 the machine 10 begins making the i-th, initially the first, sandwich. At each pass through a loop comprised of steps 404, 406, and 408, the value of i is adjusted to correspond to the number of sandwiches made. A comparison is made at step 404 after each sandwich is assembled to determine if $i<M$. If $i<M$, then the aforementioned loop is entered. Completion of the loop can be temporarily stopped at step 406 and restarted at step 408. When $i \geq M$, the repeat mode is exited and a path is followed leading to the beginning of the program.

If, at step 388, it is not desired to produce more than one sandwich, the path leading to step 410 is followed. The subsequent steps in this single sandwich mode are identical to the steps in the repeat mode except that no i-th iteration loop is provided. Therefore, only briefly describing the single sandwich mode, sandwich fillings are selected at step 410, at step 412 a check is made to determine if the carriage is in the proper position, and at step 414 the sandwich is produced.

The foregoing is a description of the principal steps in the software program used to control operation of the machine. Since the flow chart is schematic in nature, certain minor steps in the program have been omitted. For instance, after each sandwich is made, the CRT's 302 display of the i-th value is updated. As another example, after each step in the program the machine can be reset to restart. These and other omitted steps only serve to embellish the program. The steps set forth in FIG. 16 are sufficient to teach one skilled in the art how to write a software program for controlling operation of the machine 10.

IN OPERATION, the sandwich machine functions as follows. Assume that cannisters 24 and 26 are filled with selected sandwich fillings and the machine is at rest with the carriage located at the left hand end of the machine as shown in FIGS. 1 and 2 and support tray 140 disposed in its forward position (i.e., the position shown in full lines in FIG. 4). A selected sandwich facing such as a submarine roll is placed on support tray 140 and then the combination of sandwich fillings desired to be dispensed onto the sandwich facing is entered into the keyboard 310 for transfer to controller 32. Then the start button is depressed to initiate operation of the machine. Immediately the controller generates a signal that causes pneumatic actuator 150 to retract support tray 140 so as to place that tray in line with the rear row of cannisters 24, and then the controller signals actuator knife motor controller 340 and carriage motor controller 342 to energize respectively electric motor 120 to drive cutting blades 90 and carriage drive motor 244 to move the carriage 30 along its predetermined path whereby tray 140 is transported beneath the row of first cannisters 24. Initially Drive motor 244 operates so as to cause carriage 30 to move at a selected substantially constant speed lengthwise of the row of cannisters 24.

As the carriage approaches the first cannister 24 from which a preselected filler is to be dispensed, controller 32 triggers a selected solenoid valve 326, causing pressurized air to be applied to the associated pneumatic actuator 72 so as to cause it to shift the associated door 36 to open position, whereupon the preselected solid sandwich filler in that first selected cannister drops onto table section 94A of the carriage. Continued movement of the carriage 30 along its predetermined path exposes the sandwich filler to the first reciprocating cutting blade 90A which cuts off a single slice of the filler. The slice moves through opening 108A and falls down onto the sandwich facing carried by support tray 140. As this slicing occurs, the solid sandwich filler loaf slides onto table sections 94B and then, as the carriage continues to move, a second slice is removed by cutting blade 90B and the loaf of filler becomes supported by table section 94C. Further movement of the carriage under the first selected cannister 24 causes a third slide to be removed by cutter blade 90C and the loaf of filler to be supported by table section 94D. Then, while the loaf of filler is supported on table section 94D, controller 32 triggers the same solenoid valve so that it will apply pressurized air to the same actuator so as to cause the latter to shift the open door to the closed position. As this occurs, the door slides under the loaf of filler material, lifting it off clear of carriage 30.

Additional solid sandwich filler material is dispensed in like manner from each other preselected cannister as the carriage moves in turn below each of those cannisters. When the carriage has moved clear of the rightmost cannister 24 (as seen in FIG. 1), the carriage is stopped, controller 32 triggers the solenoid valve 328 that controls the pneumatic cylinder 150, causing the valve to apply pressurized air to pneumatic cylinder 150 so as to cause the latter to move support tray 140 to its second position (FIG. 4) beneath the second row of second apertures 18.

Then controller 32 energizes carriage drive motor 244 in reverse, whereupon that motor causes carriage 30 to move in the opposite direction at the same selected substantially constant speed used to convey support tray beneath the cannisters 24. As each of the preselected ones of the second cannisters 26 is approached, the controller 32 triggers the solenoid valve 330 which controls pneumatic cylinder 220, causing valve 330 to apply pressurized air to cylinder 220 so as to cause it to move rack gear 222 to its extended position just in time for it to engage and drive the second pinion gear 218 associated with that selected cannister 26. Rotation of pinion gear 218 drives the associated first pinion gear 212, causing the latter to rotate the associated driver 200. The latter, acting through the sliding engagement of pin 196 and radial follower slots 194, causes intermittent rotation of the feed wheel 180. In this preferred embodiment, the length of rack 222 is such as to cause pinions 212 and 218 to rotate driver 200 through two full revolutions, with the result that feed wheel 180 undergoes two $\frac{1}{4}$ turns separated by a dwell period. During the rotation cycle of feed wheel 180 loose sandwich filler is dispensed onto the sandwich facing carried beneath the second cannister 26 on the support tray 180. Wiper 234 is displaced from arm 198 by an angle such that it will enter the recess 182 located in the six o'clock or filler discharge position during the dwell period of feed wheel 180 Wiper 234 moves smoothly through the recess 182 and removes any remaining filler for deposit on the sandwich facing. As the rack moves clear of pinion 218, controller 32 causes solenoid valve 330 to change states so as to cause actuator 220 to retract rack gear 222.

Additional loose sandwich filler may be dispensed in like manner from successive selected cannisters 26 as carriage 30 travels along its path. When the carriage 30 reaches the position from which it started, the carriage motor is deenergized to stop the carriage, permitting the completed sandwich to be removed from support tray 140 and making the machine available to make a new sandwich. After a new sandwich selection has been made and the START button actuated, the machine will operate in the manner previously described to produce a sandwich in accordance with the new preselected combination.

While the preferred embodiment of the invention includes the various elements described above, certain changes in the number, type, and location of these elements are considered as being within the scope of the invention. In place of using two parallel rows of cannisters, one, three, or other numbers of rows can be used. When three or more rows of cannisters are utilized, certain modifications obvious to one skilled in the art will be required in the means for moving the sandwich facing support tray between rows of apertures. In place of three cutting blades, one, two, four or some other number of blades can be used with an opening being formed in the table beneath each blade. Also a rotary cutter blade may be substituted for each straight blade.

The feed wheel drive means for the cannisters 26 also may be modified so as to eliminate the need for mechanical interaction with the moving carriage, e.g., individual ratchet and pawl mechanisms, each operated by a solenoid or pneumatic actuator, may be used to selectively drive the feed wheels. In such case each feed wheel drive mechanism may be designed so that all of its operating parts are mounted directly to a cannister, or some parts may be attached to the cannister and others to the base 14.

Where the feed wheel drive mechanisms for bulk food cannisters 26 are operable independently of movement of the carriage, e.g. by independently electrically operable ratchet and pawl mechanisms, the mode of operation of the machine may be varied to permit carriage 30 to undergo intermittent movement on its return stroke, i.e., when the sandwich facing support tray is moving beneath cannisters 26. More specifically the machine may be modified to provide a mode of operation in which the carriage drive motor is controlled so that (a) carriage 30 stops to locate the sandwich facing support tray 140 beneath each selected canister 26 for a brief period of time during which the associated feed wheel drive mechanism is operated to dispense a selected filler material, and (b) the carriage moves the sandwich facing support tray 140 past non-selected cannisters without stopping. With this alternative mode of operation, the carriage drive motor will still cause the carriage to move at a substantially constant speed as it advances the tray 140 beneath each of the rear cannisters 24.

Further to increase the rate of production of the machine, a variable speed carriage drive motor can be used together with related modification of the software so as to provide a mode of operation in which the carriage travels at a first relatively low speed beneath selected cannisters 24 and/or 26 and at a second faster speed beneath non-selected cannisters. A further mode of increasing the production rate is to alter the computer program of the controller so as to cause the carriage to stop its left to right movement (as viewed in FIG. 1) and to start its reverse movement with the tray 140 shifted to its forward position in line with bulk food canisters 26 as soon as the last preselected solid sandwich filler has been dispensed from its canister 24, thereby shortening the time required to make the sandwich.

Alternative carriage drive means are envisioned comprising rack and pinion or chain and sprocket drive assemblies. Similarly, in lieu of the optical sensors and vane assembly, carriage position sensing may be accomplished using a stepping motor and counter.

Still other possible modifications will be obvious to persons skilled in the art.

Since certain other changes may be made in the above apparatus without departing from the scope of the invention herein involved, it is intended that all matter contained in the above description or shown in the accompanying drawing shall be interpreted in an illustrative and not in a limiting sense.

What is claimed is:

1. A machine for making sandwiches comprising a sandwich facing and a sandwich filler, the machine comprising:
    a frame including a horizontal base member having a plurality of apertures arranged in a straight row;
    a plurality of first cannister means each adapted to store a solid sandwich filler such as meat or cheese, each of said cannister means being removably positioned above and in alignment with said apertures whereby a sandwich filler may be dispensed from said cannister means via said apertures;
    a carriage positioned beneath said base member, said carriage including support means for carrying a sandwich facing;
    guide means supporting said carriage for reciprocal movement parallel to said base member along a path that extends lengthwise of said row of apertures;
    drive means for moving said carriage along said path so as to successively position said support means below successive ones of said apertures;
    dispensing means for removing sandwich filler from selected ones of said cannister means and depositing the same on said sandwich facing as said carriage advances along said path, said dispensing means including a selectively operable door mounted for slidable movement adjacent a bottom end of said each first cannister means, said dispensing means further comprising a plurality of selectively operable door operating means each associated with a corresponding respective one of said doors for moving said doors between a first open position wherein said bottom ends of said first cannister means are open for removal of a selected sandwich filler and a second closed position wherein said bottom ends are blocked and said solid sandwich filler in said first cannister means is supported by said doors; and
    control means for controlling movement of said carriage and operation of said dispensing means.

2. A machine according to calim 1, wherein each door comprises:
    an inclined leading edge formed for initiating an upward motion of said solid sandwich filler when said door operating means moves said door from said first open position to said second closed position.

3. A machine according to claim 1, wherein each of said door operating means comprises:
    lever means pivotally mounted to said frame adjacent each of said first cannister means;
    means providing a pivotal connection between each lever means and a corresponding respective one of said doors, and selectively operable electromechanical means for reciprocating said lever means so as to cause movement of the corresponding respective one of said doors between said first and second positions.

4. A machine according to claim 3, wherein each of said electromechanical means comprises a two-way pneumatic cylinder mounted to said frame adjacent each of said lever means and connected to a second end of said lever means for causing said lever means to pivot thereby moving a corresponding respective one of said doors between said first open and second closed positions; and
    first solenoid valve means coupled to said two-way pneumatic cylinder for causing said cylinder to move between a first position where said door is in said first open position and a second position where said door is in said second closed position.

5. A machine according to claim 1, wherein said dispensing means comprises:
    a table mounted on the upper side of said carriage so as to be movable therewith
    electrically-operable knife means mounted on said table for cutting solid filler material so as to from at least one discrete slice thereof;
    at least one opening in said table beneath said knife means, said knife means and said at least one opening being positioned so that movement of said carriage past a selected one of said first cannister means causes slices of said filler to be removed by said knife means and to pass through said opening for deposit onto said sandwich facing carried on said support means.

6. A machine according to claim 5, wherein said knife means comprises:
    a knife holder and a plurality of mutually spaced cutting blades affixed to said holder, said cutting blades being offset relative to one another so that as said carriage advances beneath selected ones of said plurality of said first cannister means, successive portions of the solid sandwich filler are sliced by successive ones of said cutting blades.

7. A machine according to claim 6 further comprising knife drive means coupled to said holder for reciprocating said holder in a direction transverse to said path and along a plane extending parallel to said horizontal base, said knife drive means being attached to and movable with said carriage.

8. A machine according to claim 7, wherein said knife drive means comprises:

an electric motor mounted on said carriage adjacent said knife means;

a cam follower formed in said holder;

a cam attached to an output shaft of said electric motor for rotation therewith, said cam being sized and positioned to engage said cam follower for translating rotational movement of said output shaft to said reciprocal motion of said knife assembly.

9. A machine according to claim 5, wherein said table has a plurality of table sections offset from one another and coacting to form a plurality of openings, and further wherein said knife means comprises a plurality of cutting blades each disposed adjacent one of said openings, whereby successive slices of solid sandwich filler will be severed by said cutting blades from a loaf of solid sandwich filler contained in a selected first canister means and discharged through separate ones of said openings 10. A machine according to claim 5, further comprising a curved leading edge on said table for engaging a loaf of solid sandwich filler as said carriage moves beneath the selected cannister in which said loaf is disposed.

11. A machine according to claim 1, wherein said frame includes first and second rows of apertures and further wherein said support means comprises:

a support tray sized for receiving selected sandwich facings;

movable means supporting said support tray, and means for moving said movable means so as to cause said tray to move between a first position beneath said first row of said apertures and a second position beneath said second row of said apertures 12. A machine according to claim 1, wherein said guide means comprises a pair of mutually-spaced rails mounted to said horizontal base and extending along and adjacent to said row of apertures, and roller means mounted on said carriage and engaged with said rails so as to permit reciprocal movement of said carriage along said path; and said carriage drive means comprises pulleys rotatably attached to said bottom side of said horizontal base, a reversible carriage drive motor attached to said base, a capstan attached to and driven by said electric motor, and a cable attached to said capstan and carriage and extending around said pulley, said pulleys and capstan being arranged so that rotation of said capstan will cause said cable to move said carriage along said rails in a first direction or in a second opposite direction according to the direction in which said motor is operated.

13. A machine according to claim 1, wherein:

said cannister means comprises a plurality of second cannister means adapted to store loose sandwich filler such as sliced pickles or shredded lettuce, and said dispensing means comprises barrier members in the form of feed wheels mounted at the bottom end of each of said second cannister means for selectively dispensing loose sandwich filler therefrom, and drive means for selectively operating said feed wheels so as to selectively dispense loose sandwich filler from selected ones of said second cannister means.

14. A machine according to claim 13, wherein each of said feed wheels comprises at least one recessed section formed in its peripheral surface for holding a measured amount of loose sandwich filler, and further wherein said bottom ends of said second cannister means are shaped to allow discharge of loose sandwich filler from said at least one recessed section when said feed wheel is rotated to a selected discharge position.

15. A machine according to claim 14, further including wiper means associated with each of said feed wheels for removing loose sandwich filler from said at least one recessed section.

16. A machine according to claim 13 wherein said drive means comprises:

a star wheel rotatably mounted adjacent to the bottom end of each of said second cannister means comprising a plurality of drive sections and a plurality of circularly curved recessed sections disposed in alternately-occurring relation to one another;

means connecting said star wheel to said feed wheel so that the said star wheel and feed wheel rotate as a unit;

a plurality of radial follower slots integrally formed in each of aid drive sections;

a star wheel driver rotatably mounted adjacent each star wheel, said driver having an arm and a pin affixed to said arm in position to be received by each of said radial follower slots when said each slot is in a selected position, said star wheel driver also having a circularly curved shoulder sized and positioned for sliding engagement in each of said circularly curved recessed positions; and means for rotating said star wheel driver so that continuous rotation of said star wheel driver will cause said pin to coact with each slot in succession to rotate said star wheel, the motion of said pin being such that it enters and moves along a slot and then moves back out of said slot, whereby said star wheel undergoes alternating rotation and dwell cycles in response to rotation of said star wheel driver.

17. A machine according to claim 16, wherein said shoulder and said recessed sections are positioned and configured so that said shoulder slidingly engages successive ones of said recessed sections thereby aligning said follower slots with said pin.

18. A machine according to claim 16, wherein said means for rotating said star wheel driver comprises:

a first pinion gear rotatably mounted for transmitting rotational motion to said driver, said first pinion gear being mounted in a bracket attached to said machine adjacent said star wheel;

a second pinion gear rotatably mounted for transmitting rotational motion to said first pinion gear, said second pinion gear being mounted in said bracket; and selectively operable means mounted on said carriage for selectively engaging and driving said second pinion gear.

19. A machine according to claim 18 wherein said selectively operable means comprises:

a rack gear movably mounted to said carriage; and selectively operable rack gear actuating means for moving said rack gear from a first non-driving position to a second driving position in which it will engage and drive selected ones of said second pinion gears as said carriage approaches selected ones of said plurality of second cannister means.

20. A machine according to claim 16, wherein a wiper means is secured to said star wheel driver for rotation therewith, said wiper means being arranged to enter said at least one recessed section during said dwell cycle for removing loose sandwich filler therefrom.

21. A machine for making sandwiched food items comprising a sandwich facing and a sandwich filler, the machine comprising:
   a frame including a horizontal base member having a plurality of apertures arranged in a straight row;;
   a plurality of cannister means adapted to store solid sandwich filler such as meat or cheese, each of said plurality of cannsister means being positioned above and in alignment with one of said apertures, so that solid sandwich filler may be dispensed from selected ones of said cannister means via said apertures;
   a carriage positioned beneath said base member, said carriage including support means for carrying a sandwich facing;
   guide means supporting said carriage for reciprocal movement parallel to said base member along a path that extends lengthwise of said row of apertures;
   drive means for causing said carriage to move along said path so as to successively position said support means below successive ones of said apertures;
   a selectively operable door associated with each of said plurality of cannister means, said door mounted for slidable movement adjacent a bottom end of said cannister means;
   a plurality of selectively operable door-operating means each associated with a corresponding respective one of said doors for moving said doors between a first open position wherein said bottom ends of said cannister means are open for removal of said sandwich filler material and a second closed position wherein said bottoms are blocked and solid sandwich material in said cannister means are supported by said doors;
   electrically operable knife means mounted on the upper side of said carriage so as to be movable therewith, said knife means being configured for cutting solid sandwich filler as to form at least one discrete slice thereof;
   at least one opening in said carriage beneath said knife means, said knife means and said at least one opening being positioned so that movement of said carriage past said selected cannister means causes slices of said filler to be removed by said knife means and to pass through said opening for deposit onto said sandwich facing carried on said support means; and
   control means for controlling movement of said carriage and operation of said dispensing means.

22. A machine for making sandwiched food items comprising a sandwich facing and a sandwich filler, the machine comprising:
   a frame including a horizontal base member having a plurality of apertures arranged in a straight row;
   a plurality of cannister means adapted to store loose sandwich filler such as sliced pickles or shredded lettuce, each of said plurality of cannister means being positioned above and in alignment with one of said apertures, so that loose sandwich filler may be dispensed form said cannister means via said apertures;
   a carraige positioned beneath said base member, said carriage including support means for carrying a sandwich facing;
   guide means supporting said carriage for reciprocal movement parallel to said base member along a path that extends lengthwise of said row of apertures;
   drive means for moving said carriage along said path so as to successively position said support means below successive ones of said apertures;
   a plurality of feed wheels each mounted at the bottom end of said cannister means for selectively dispensing loose sandwich filler therefrom for deposit via said apertures onto said sandwich facing as said carraige moves along said path;
   drive means for selectively operating said feed wheels so as to selectively dispense loose sandwich filler from selected ones of said cannister means; and
   control means for controlling movement of said carriage and operation of said dispensing means.

23. A machine for making sandwiched food items comprising a sandwich facing and a sandwich filler, the machine comprising:
   a frame including a horizontal base member having a plurality of apertures arranged in straight first and second rows;
   a plurality of first cannister means adapted to store solid sandwich filler such as meat or cheese, each of said plurality of first cannister means being positioned above and in alignment with one of said apertures located in said first row, so that solid sandwich filler may be dispensed from selected ones of said first cannister means via said apertures;
   a plurality of second cannister means adapted to store loose sandwich filler such as sliced pickles or shredded lettuce, each of said plurality of second cannister means being positioned above and in alignment with one of said apertures located in said second row, so that loose sandwich filler may be dispensed from said second cannister means via said aperturs;
   a carriage positioned beneath said base member;
   guide means supporting said carriage for reciprocal movement parallel to said base member along a path that extends lengthwise of said first and second rows of apertures;
   support means movably mounted on said carriage for carrying a sandwich facing, and means connected to said support means for moving said support means between a first position beneath said first row and a second position beneath said second row;
   drive means for causing said carriage to move along said path so as to successively position said support means below successive ones of said apertures;
   first dispensing means for removing solid sandwich filler from selected ones of said first plurality of cannister means and depositing the same on said sandwich facing as said carriage advances along said path and said support means is located in said first position beneath said first row of apertures, said first dispensing means including a selectively operable barrier member associated with each one of said plurality of first cannister means for controlling removal of solid sandwich filler from said first cannister means;
   second dispensing means for removing loose sandwich filler from selected ones of said plurality of second cannister means and depositing the same on said sandwich facing as said carriage advances along said path in a direction opposite to that traveled when said support means is in said first position and said support is located in said second position beneath said second row of apertures said second dispensing means including a selectively operable barrier member associated with each second cannister means for controlling removal of loose sandwich filler from said second cannister means; and control means for controlling movement of said carriage and operation of said dispensing means.

24. A machine according to claim 23, including an enclosure about said machine, said enclosure including a door for permitting access to said cannisters for installation or filling of said cannisters.

25. A machine according to claim 24, including refrigeration means for maintaining a selected temperature inside said enclosure so as to prevent spoilage of said sandwich filler.

26. A machine according to claim 1, wherein said control means comprises:

first control means for receiving, processing and outputting data;

second control means for generating information regarding the position of the carriage along said path, said second control means being so connected to said first control means as to transmit said information thereto;

third control means for inputting sandwich filler selection information to said first control means; and fourth control means responsive to control signals from said first control means for selectively actuating said drive means and said dispensing means.

27. In a machine for making sandwiches, a solid sandwich filler slicing mechanism for cutting slices of solid sandwich filler from a loaf thereof, said mechanism comprising:

a carriage having a frame and means for mounting said frame for movement along a predetermined path;

table-defining means attached to said frame so as to be movable therewith, said table-defining means comprising at least three parallel table sections arranged in tandem along said predetermined path with an opening formed between each pair of adjacent table sections, said table sections being offset relative to one another in a direction extending at a right angle to thier planes and said predetermined path; and an operative knife assembly comprising at least first and second mutually spaced cutting blades, means mounting said knife assembly for movement with said frame along said predetermined path, and electrically powered means for driving said cutting blades, said cutting blades being offset relative to one another in a manner corresponding to the offset of said table sections, each of said cutting blades being positioned adjacent a different one of said openings, so that as a loaf of sold sandwich filler is exposed successively first to one and then to another of said cutting blades as a consequence of movement of said carriage along said path, successive portions of solid sandwich filler are sliced by successive ones of said cutting blades and dispensed through successive ones of said openings.

28. Apparatus according to claim 27 wherein said knife assembly comprises a knife holder mounted for reciprocal movement relative to said frame in a direction transverse to said predetermined path, and said cutting blades are elongate flat blades that are attached to said knife holder and extend across said predetermined path, and further wherein said electrically powered means comprises an electric motor attached to said frame and means connecting the output shaft of said motor and said knife holder for converting rotational motion of said shaft to reciprocal motion of said knife holder.

* * * * *

UNITED STATES PATENT AND TRADEMARK OFFICE
CERTIFICATE OF CORRECTION

PATENT NO. : 4685387

DATED : August 11, 1987

INVENTOR(S) : Robert K. Hanson et al

It is certified that error appears in the above-identified patent and that said Letters Patent is hereby corrected as shown below:

Claim 2, column 16, line 6, "calim" should be -- claim --;

Claim 9, column 17, line 19, there should be a period after the word "openings";

Claim 11, column 17, line 34, "apertures" should be inserted after -- said -- (second occurrence);

Claim 16, column 18, line 21, "aid" should be -- said --;

Claim 16, column 18, line 24, there should be a comma after "arm";

Claim 21, column 19, line 7, delete one semicolon;

Claim 21, column 19, line 37, "filler" should be inserted after -- sandwich --;

Claim 22, column 19, line 64, "form" should be -- from --;

Claim 23, column 20, line 38, "aperturs" should be -- apertures --;

UNITED STATES PATENT AND TRADEMARK OFFICE
CERTIFICATE OF CORRECTION

PATENT NO. : 4685387

DATED : August 11, 1987

INVENTOR(S) : Robert K. Hanson et al

It is certified that error appears in the above-identified patent and that said Letters Patent is hereby corrected as shown below:

(PAGE TWO)

Claim 27, column 22, line 11, "thier" should be -- their --;

Claim 27, column 22, line 14, "mutally" should be -- mutually --; and

Claim 27, column 22, line 22, "sold" should be -- solid --.

Signed and Sealed this

Fifteenth Day of December, 1987

Attest:

DONALD J. QUIGG

*Attesting Officer*     *Commissioner of Patents and Trademarks*